United States Patent
Ahuja et al.

(10) Patent No.: US 10,495,879 B1
(45) Date of Patent: Dec. 3, 2019

(54) APPARATUSES, METHODS AND SYSTEMS FOR WEARABLE DISPLAYS

(71) Applicant: Meta View, Inc., San Mateo, CA (US)

(72) Inventors: Ashish Ahuja, Mountain View, CA (US); Jie Xiang, Cupertino, CA (US); Ting Heng Hsieh, San Mateo, CA (US); Shengtong Chen, Palo Alto, CA (US); Run Huang, Sunnyvale, CA (US)

(73) Assignee: Meta View, Inc., San Mateo, CA (US)

( * ) Notice: Subject to any disclaimer, the term of this patent is extended or adjusted under 35 U.S.C. 154(b) by 0 days.

(21) Appl. No.: 15/717,882

(22) Filed: Sep. 27, 2017

Related U.S. Application Data

(60) Provisional application No. 62/400,577, filed on Sep. 27, 2016.

(51) Int. Cl.
| | |
|---|---|
| *G02B 27/14* | (2006.01) |
| *G09G 5/00* | (2006.01) |
| *G02B 27/01* | (2006.01) |
| *G02B 5/04* | (2006.01) |
| *F21V 8/00* | (2006.01) |

(52) U.S. Cl.
CPC ......... *G02B 27/0172* (2013.01); *G02B 5/045* (2013.01); *G02B 6/0053* (2013.01); *G02B 2027/0118* (2013.01); *G02B 2027/0134* (2013.01)

(58) Field of Classification Search
CPC ...... G02B 2027/013; G02B 2027/0178; G02B 27/01; G02B 27/0101; G02B 27/017; G02B 27/0172; G02B 27/0149; G02B 27/0176; G02B 5/045; G02B 6/0053; G02B 2027/0118; G02B 2027/0134
USPC ................... 359/619, 629, 630, 631; 345/7–9
See application file for complete search history.

(56) References Cited

U.S. PATENT DOCUMENTS 9,632,315 B2 * 4/2017 Smith ...................... G02B 3/08

* cited by examiner

*Primary Examiner* — William Choi
(74) *Attorney, Agent, or Firm* — Andrew Bodendorf

(57) ABSTRACT

Aspects of the disclosed apparatuses, methods, and systems provide enhanced display of images for personal wearable display devices. The display systems include various system components to implement one or more of: re-directing the maximal brightness of a display device towards the center of the eye-box of a user; selectively narrowing the viewing angle of light emitted by the display device; and by spatially optimizing the backlight of the display device based on the specification of the wearable optical system thereby optimizing and/or maximizing the amount of light entering the eye for a range of gaze rotation of a user of the wearable display system. In one example, the following description provides a display device including a light optimizing or directing layer. The light optimizing layer includes one or more films that optimize the amount of light directed to the eye box of a user of the wearable display system. The light optimizing layer may include one or more films positioned to direct light from the image source and illumination source in a desired manner.

31 Claims, 20 Drawing Sheets

Luminance pattern of normal TN LCD

Polar angle
Cross section along the red horizontal line

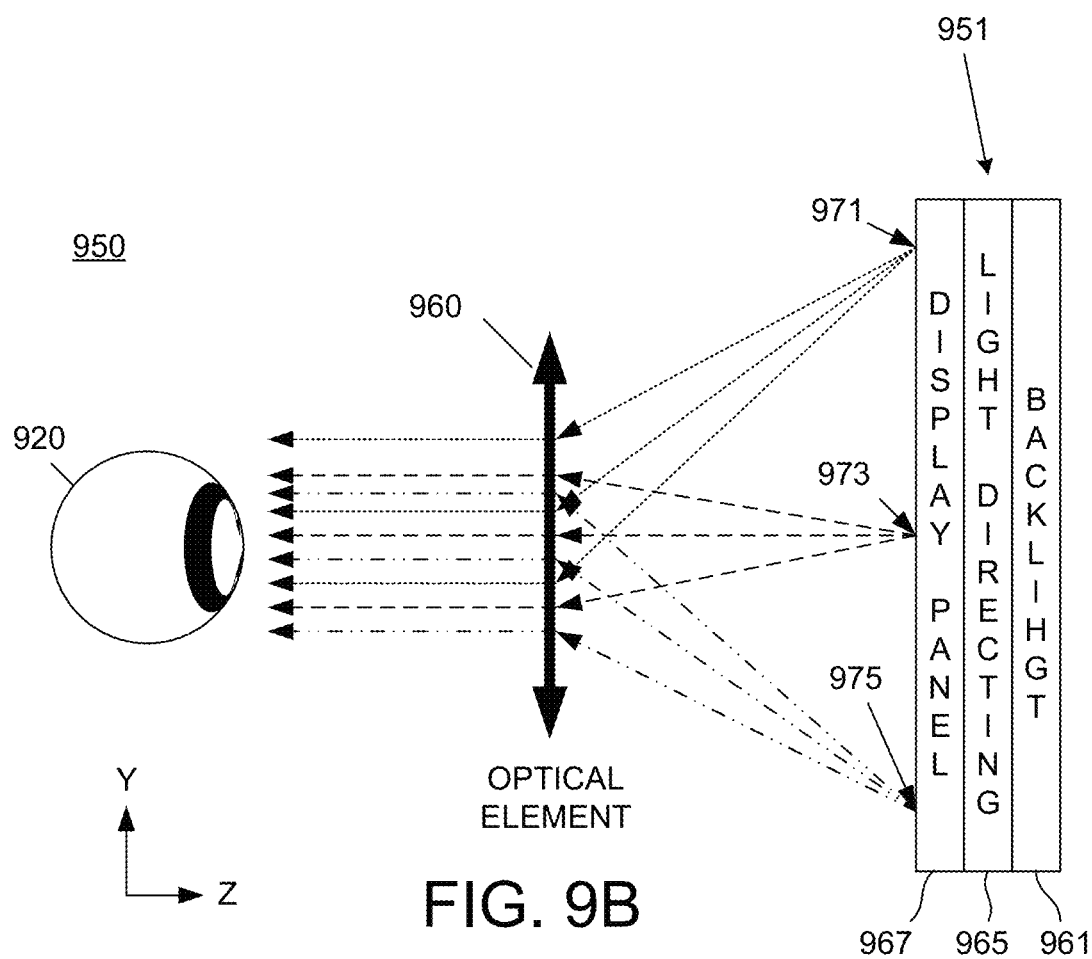

APPARATUSES, METHODS AND SYSTEMS FOR WEARABLE DISPLAYS

CROSS-REFERENCE TO RELATED APPLICATIONS

This application claims the benefit under 35 U.S.C. § 119(e) of U.S. Provisional Application No. 62/400,577, titled "APPARATUSES, METHODS AND SYSTEMS FOR WEARABLE DISPLAYS" filed on Sep. 27, 2016, in the U.S. Patent and Trademark Office, which is herein expressly incorporated by reference in its entirety for all purposes.

BACKGROUND

The interest in wearable technology has grown considerably over the last decade. For example, wearable virtual reality (VR) displays present virtual images to the user to provide a virtual environment. Now augmented reality (AR) displays are being developed that may be worn by a user to present the user with a synthetic image overlaying a direct view of the environment. Both VR and AR displays are able to present virtual digital content. One example of a virtual digital content is a three-dimensional (3-D) virtual object. VR or AR display systems allow a user to interact with the 3-D virtual object within a virtual space. For example, a user may can select, move, or otherwise interact with a virtual object. Interaction with virtual objects is facilitated by various sensors, which collect data about a user's environment. However, technical challenges exist as to how to facilitate perception of and user interaction with a virtual environment.

SUMMARY

Aspects of the disclosed apparatuses, methods, and systems describe wearable display systems. The display systems include various system components to implement one or more of: re-directing the maximal brightness of a display device towards the center of the eye-box of a user; selectively narrowing the viewing angle of light emitted by the display device; and by spatially optimizing the backlight of the display device based on the specification of the wearable optical system thereby optimizing and/or maximizing the amount of light entering the eye for a range of gaze rotation of a user of the wearable display system. In some examples, the following description provides a display device including a light optimizing or directing layer. The light optimizing layer includes one or more films that optimize the amount of light directed to the eye box of a user of the wearable display system. The light optimizing layer may include one or more films positioned to direct light from the image source and illumination source in a desired manner. In one example, a direction-turning film (DTF) is provided to turn and/or direct the main rays of light passing through the film. In another example, a brightness enhancing film (BEF) is provided to focus or narrow the range of viewing angles of light passing through the film.

In one general aspect, a wearable display system includes a display device and an optical component. The display device includes a display panel operable to generate an image; and a light directing layer arranged to direct light emitted by the display corresponding to the image, the light directing layer including one or more transparent films directing light passing through the one or more films. The optical component includes a reflective or partially reflective surface. The reflective or partially reflective surface of the optical component projects the image from the display panel to an eye-box corresponding to the eyes of a user wearing the display system. The one transparent film of the light directing layer includes a microstructure formed in the one transparent film directing light emitted from a point on a surface of the display panel to target a desired portion of the reflective or partially reflective surface of the optical component.

The light directing layer also may maximize the amount of light emitted from the display panel along an angle of incidence formed from the display panel to the optical component to the eye-box of a user wearing the display system.

The microstructure formed in the one transparent film may include one or more parallel, triangular grooves or notches formed in a surface of the film, the grooves or notches forming one or more right-angled prisms, where each prism has a prism angle corresponding to the direction of light emitted from the display panel. The prism angle of any prism of the film may correspond to an optical property of the optical component at a point on the optical component where a main ray of light passing through a prism is reflected or partially reflected by the optical component. The film may include at least two prisms each having different prism angles. The prism angle also may correspond to an angle of incidence defined by an optical prescription of the optical component at a point of the surface at which a main ray of light emitted from the display is reflected from the optical component to the eye-box.

The light directing layer may include a first region and a second region, the first region having a micro-prism structure that turns light emitted from the display panel with respect to a surface normal of the display panel at a first turning angle and the second region having a micro-prism structure that turns light emitted from the display panel with respect to the surface normal of the display panel at second turning angle that is different from the first angle. The turning angle of each region formed in the film may correspond to an optical property of the optical component at a portion of the optical component where main rays of light passing through each region are reflected or partially reflected by the optical component to the eye-box of a user wearing the display system.

The light directing layer may include two transparent films, each transparent film having a micro-prism structure directing light in a different spatial dimension of the display system.

The microstructure formed in the one transparent film may include one or more parallel, triangular grooves or notches formed in a surface of the film, the grooves or notches forming one or more prisms, where each prism having a prism angle prism angle that narrows a width of an intensity distribution of light emitted from a point of the display panel. The prism angle of any prism of the film may correspond to an optical property of the optical component at a point on the optical component where a ray of light passing through a prism is reflected or partially reflected by the optical component.

The microstructure formed in the one transparent film may include one or more parallel, triangular grooves or notches formed in a surface of the film, the grooves or notches forming one or more prisms, where each prism having a prism angle shaping light emitted from the display panel. The prism angle of any prism of the film may correspond to an optical property of the optical component at a point on the optical component where a ray of light passing through a prism is reflected or partially reflected by the optical component. The film may include at least two prisms each having different prism angles. The prism angle also may correspond to an angle of incidence defined by an optical prescription of the optical component at a point of the surface at which a ray of light emitted from the display is reflected from the optical component to the eye-box.

The light directing layer may include a first region having a micro-prism structure that narrows an intensity distribution of light passing through the regions to a first width and a second region having a micro-prism that narrows an intensity distribution of light passing through the regions to a second width that is different from the first width. The shaping width of each region formed in the film may correspond to an optical property of the optical component at a portion of the optical component where rays of light passing through each region are reflected or partially reflected by the optical component to the eye-box of a user wearing the display system.

The light directing layer also comprises one or more second transparent films, each second transparent film including one or more parallel, triangular grooves or notches formed in a surface of the second transparent film, the grooves or notches forming one or more prisms, each prism having a prism angle that narrows a width of an intensity distribution of light emitted from a point of the display panel. The prism angle of any prism of the second film may correspond to an optical property of the optical component at a point on the optical component where a ray of light passing through a prism is reflected or partially reflected by the optical component.

BRIEF DESCRIPTION OF THE DRAWINGS

The following description illustrates aspects of embodiments of the disclosed apparatuses, methods, and systems in more detail, by way of examples that are intended to be illustrative with reference to the accompanying drawings, in which:

FIGS. 9A and 9B show light paths for a wearable display system including a display device of FIG. 4;

DETAILED DESCRIPTION

The human perceptual system has the ability to combine various sensory cues in an efficient manner in order to perceive "physically plausible" virtual content in a real-world environment. For example, the human perceptual system has the ability to integrate, among other things, sensory cues, such as one or more of luminance, depth, and/or shape information to form or perceive coherent virtual content. Virtual content may include one or more virtual objects, and/or other content that is perceived by a viewer. As a result, the properties of the human perception may be exploited through visual systems, as described herein, employing hardware, and/or software architectures to form virtual content that may be located and/or perceived to be located in the real-world environment by virtue of the principles of the depth sensitive modules of the human brain. In addition, binocular or stereographic vision display systems provide two offset images separately to the left and right eye of the viewer. These two-dimensional images are then combined in the brain of the viewer to give the perception of 3D depth. An augmented reality environment may include the views of the images of virtual content within a virtual environment superimposed over the views of the real-world environment. A virtual reality environment may include views of virtual content within a virtual environment alone.

Figure 1A:
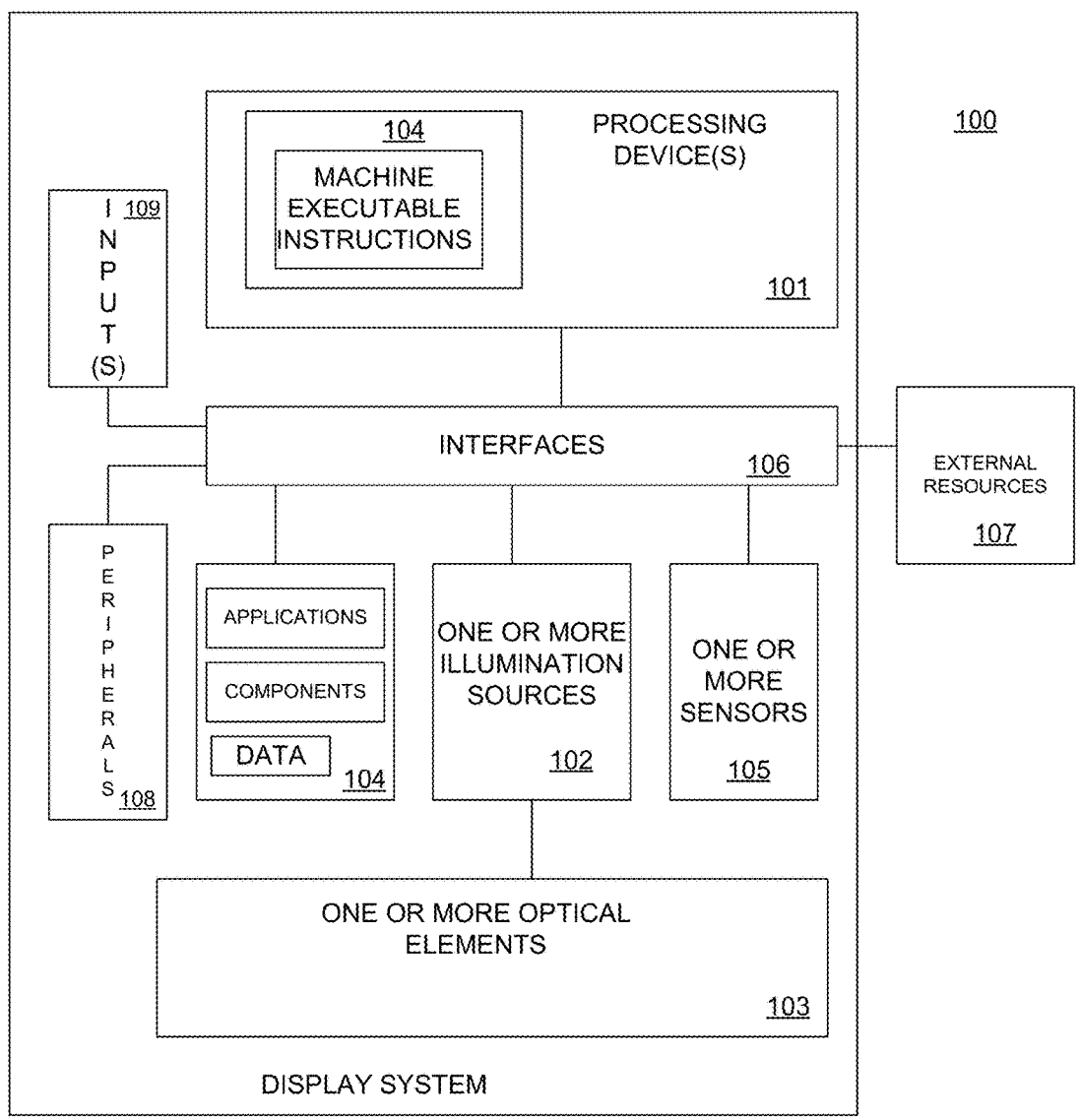
FIG. 1A shows a block diagram of an example of a display system

FIG. 1A shows an example of a display system 100 configured to provide an interactive environment, such as one or more of an augmented reality environment and/or a virtual reality environment. The display system 100 may include one or more of one or more physical processing devices 101, one or more light sources 102, one or more optical elements 103, one or more physical storage devices 104, one or more sensors 105, one or more interfaces 106, external resources 107, peripheral devices 108, inputs 109, and/or other components (not shown). In some implementations, one or more components of system 100 may be included with and/or otherwise embodied with in a headset. The headset may be configured to be installed (e.g., worn) on a head of a user to provide a wearable display system. For example, the headset may include a mechanical housing and/or frame portion in addition to various parts to hold, arrange, position, and assemble the various components of the display system 100. The headset also may include one or more straps, arms, molded pieces, padding, and/or other fasteners to position the headset on the head of a user. By way of illustration, headset may include one or more of a head-mounted display (HMD), glasses, googles, visor, and/or other display devices to be installed, mounted, or worn by a user in proximity to eyes and/or head. By way of illustration in FIGS. 11A-11E show one example of an HMD, which is described in further detail below.

In some implementations, the headset may include one or more light sources 102. The light sources may include a plurality of individual point light sources that emit light under control of the one or more processing devices. The emitted light may be a ray that travels along an individual axis of propagation from the individual point sources. It is noted that the use of the term "light ray" is not intended to limit the scope of the disclosure to single, discrete, photons, and/or packets of photons. Instead, the disclosure may envision a light ray to mean a light beam comprising multiple and continuous photons, in one or more implementations. In some implementations, a light ray may be envisioned to involve one or more light waves. A light wave may be defined by one or more of a frequency, a wavelength, an orientation (e.g., of polarization), and/or other features.

In some implementations, one or more light sources 102 are arranged by the headset to direct the light rays toward one or more optical components 103. In some examples, the light source 102 may comprise one or more of a micro-electromechanical systems (MEMS) RGB laser scanner, a micro-LED micro-display, an LED illuminated liquid crystal on silicon (LCOS), an LED/RGB laser illuminated liquid crystal on silicon (LCOS), a digital light projector (DLP), a digital micro-mirror device (DMD), a liquid crystal display (LCD), an organic light-emitting diode (OLED) display, an OLED micro-display, and/or other light sources. In some implementations, as discussed in further detail below, at least two light sources 102 are provided (e.g., at least one light source for each eye) or one light source 102 split into multiple portions to provide a binocular or stereographic vision display system.

In some implementations, a light source 102 may generate light rays based on one or more color parameters of the light rays. Color parameters may include one or more of a first color parameter, a second color parameter, a third color parameter, and/or other color parameters. A value of a first color parameter may specify one or more of a luminous intensity, a chromaticity, a brightness, and/or other attributes of a first color. A value of a second color parameter may specify one or more of a luminous intensity, a chromaticity, a brightness, and/or other attributes of a second color. A value of a third color parameter may specify one or more of a luminous intensity, a chromaticity, a brightness, and/or other attributes of a third color. By way of illustration, the first color may be red, the second color may be green, and/or the third color may be blue.

In some implementations, one or more optical components 103 are arranged by the headset such that when the headset is positioned on the head of the user, light rays generated by one or more light sources 102 are directed onto the one or more optical components 103 and reflected, partially reflected, or otherwise transmitted to the eyes of the user to form images of virtual content. In some implementations, light rays from the ambient environment surrounding the user propagating toward the one or more optical components may be transmitted through the one or more optical components. The ambient light rays and light rays from the one or more optical components are combined to form cumulative light rays that are perceived by one or more eyes of the user. As a result, the images of virtual content appear or are perceived by the user as being superimposed over the user's view of the real world through the one or more optical elements 103 to create an augmented reality environment. In some implementations, as discussed in further detail below, at least two optical components 103 are provided (e.g., at least one for each eye) to provide a binocular or stereographic vision display system. The optical components 103 may be formed as part of glasses, goggles, or embodied as image areas or apertures within a single element (e.g., a visor) positioned for viewing the eyes of a user.

In some implementations, as previously mentioned, the optical components 103 may be implemented by or incorporated in a single element, such as a visor. The visor may comprise a curved and/or freeform structure and/or may have other shapes and/or forms. In some implementations, a curved visor may have one or more of a concave side surface, a convex side surface, a peripheral side edge, a freeform surface, and/or other features and surfaces. A visor may be formed from one or more transparent optical plastics and/or other materials. A visor may be injection-molded and/or formed by other techniques. The visor material may have a low birefringence, and low thermal/stress induced birefringence (such as acrylic optical plastic), in order to avoid a rainbow effect under cross-polarizers. By way of illustration, a visor may comprise one or more of ZEONEX, Cyclo Olefin Polymer (COP), Cyclic Olefin Copolymer (COC), polycarbonate, Poly (methyl methacrylate) (PMMA), and/or other materials. A visor may include at least two optical components 103.

The optical components 103 may be described as apertures through which the user views their environment. As described below, the interior surface of the visor corresponding to the apertures may have a specifically defined shape, curvature, and/or prescription selected to reflect light from the corresponding source 102 to the eyes of user. The interior portion of the aperture (e.g., closest to the eyes of the user) and exterior surfaces of the apertures may have one or more coatings, films, laminates, or other structures to provide various visual properties with respect to light from a source 102 or the user's environment. For example, the interior surface may reflect or partially reflect light from the light source 102 while allowing light from the user's environment to pass through the aperture to the user's eye.

Figure 1B:
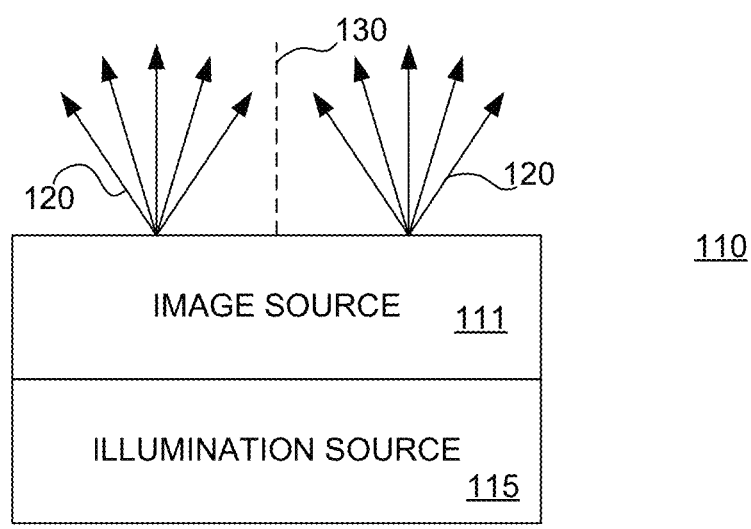
FIG. 1B schematically illustrates an example of a display device.

FIG. 1B schematically illustrates an example of an illumination source 102, such as a display device 110. The display device 110 includes an image source 111 and an illumination source 115. In one example, the display device may be a liquid crystal display (LCD) device, such as a thin-film-transistor liquid-crystal display (TFT LCD). For example, the image source 111 may be a film including a two-dimensional array of liquid crystal pixels where the transmission of each pixel from the source is electronically controlled to generate a two-dimensional image (e.g., by the output from a graphics or other processing system such as processing device 101). Of course, one skilled in the art will appreciate that the image source 111 also can be implemented with other transmission or reflection technologies, such as, for example, light emitting diode (LED) display, Liquid Crystal on Silicon (LCoS or LCOS), magneto-modulated, electro-modulated crystals, and vibrating MEMS arrays, to name but a few.

The illumination source 115 is provided to illuminate the image source 111 so that the display device 110 emits light 120 to project an image to a viewer of the display device 110. The emitted light 120 propagates from the surface of image source 111 in a wide field. Light emitted parallel to a line 130 normal to the surface of the image source 111 is strongest with diminishing brightness at angles further from the surface normal 130. In one example, the illumination source 115 may be a backlight including a light source, such as, for example, cold cathode fluorescent lamps (CCFLs), an edge-lit white light emitting diodes (EL-WLEDs); white light emitting diodes WLEDs; and a red, green, blue light emitting diodes (RGBLED). Although only two point sources of emitted light 120 are shown in FIG. 1B for ease of illustration, one skilled in the art will appreciated there are many such point sources along the surface of the image source 111.

In one example, a CCFL backlight includes at least two cold cathode fluorescent lamps placed at opposite edges of the image source, or an array of parallel CCFLs arranged behind the image source and a diffuser to spread the light emitted from the lamps evenly across the image source. An EL-WLED backlight includes a row of white LEDs placed at one or more edges of the backlight and a light diffuser. A WLED array backlight includes a full array of white LEDs placed behind a diffuser to illuminate the image source. Similarly, an RGB-LED backlight includes a full array of RGB LEDs and a light diffuser. An exemplary backlight may include one or more components in addition to an illumination source. For example, the backlight may include a mirror or reflective surface, one or more light or wave guides and/or light diffusers to distribute light to illuminate the image source 111 in a desired manner (e.g., to provide an even brightness for illumination of the image source 111).

Figure 1C:
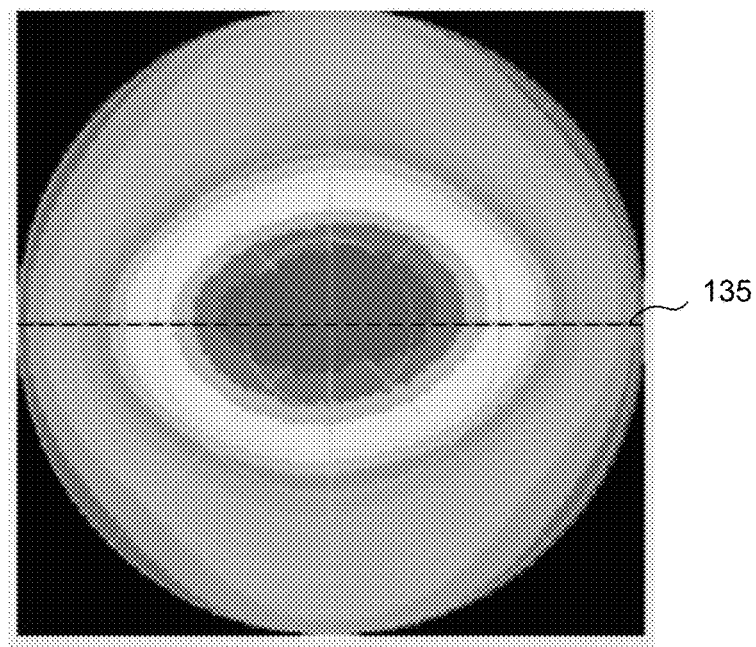
FIG. 1C is an example of a luminance pattern for the display device of FIG. 1B.
Figure 1D:
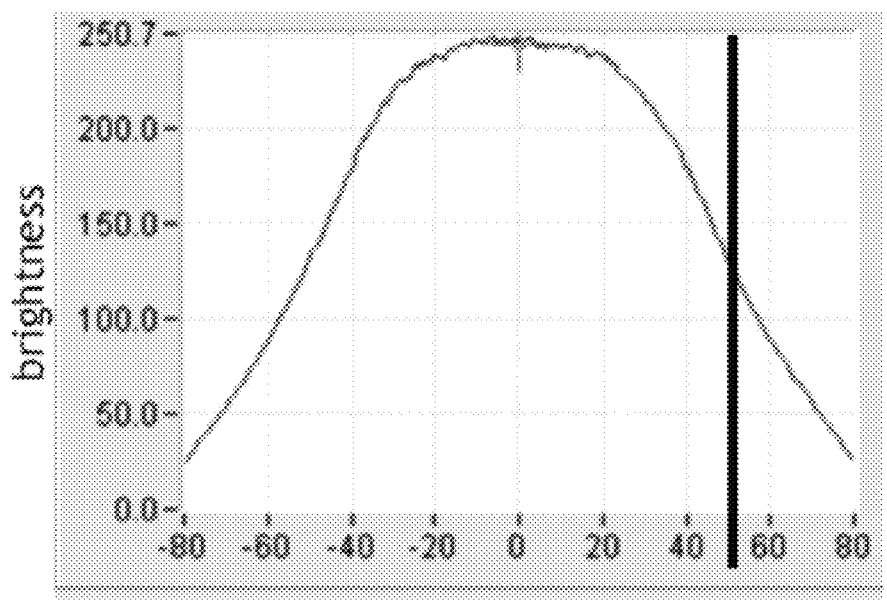
FIG. 1D illustrates an example of a relation between brightness and polar angle for a portion of the luminance pattern of FIG. 1C.

FIG. 1C is an example of one luminance pattern for a display device 110 of FIG. 1B. FIG. 1D illustrates an example of a relation between the brightness of the display device 110 and a viewing angle along line 135 of the luminance pattern of FIG. 1B. As can be seen from the FIGS. 1C and 1D, as the viewing angle from the surface normal 130 increases, the brightness of the display significantly decreases. For example, as shown in FIG. 1D, at approximately 50 degrees from the surface normal 130 the brightness of the display device decreases to about 50% of the maximum brightness. When a user views the display device 110 at an angle close to the surface normal 140, no significant loss in brightness is experienced when viewing the display device 110.

Figure 2A:
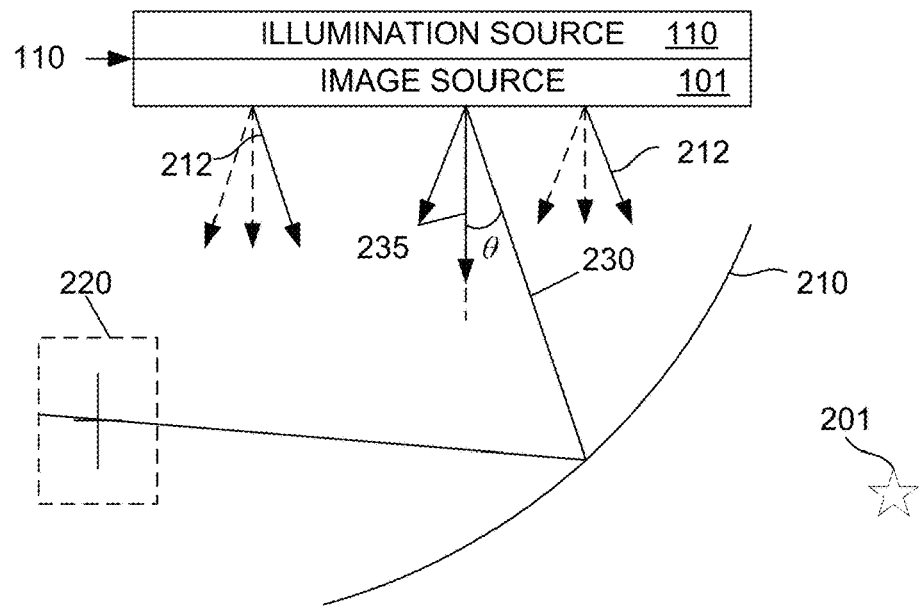
FIGS. 2A and 2B schematically show light paths for two examples of wearable display systems using a display device of FIG. 1A.
Figure 2B:
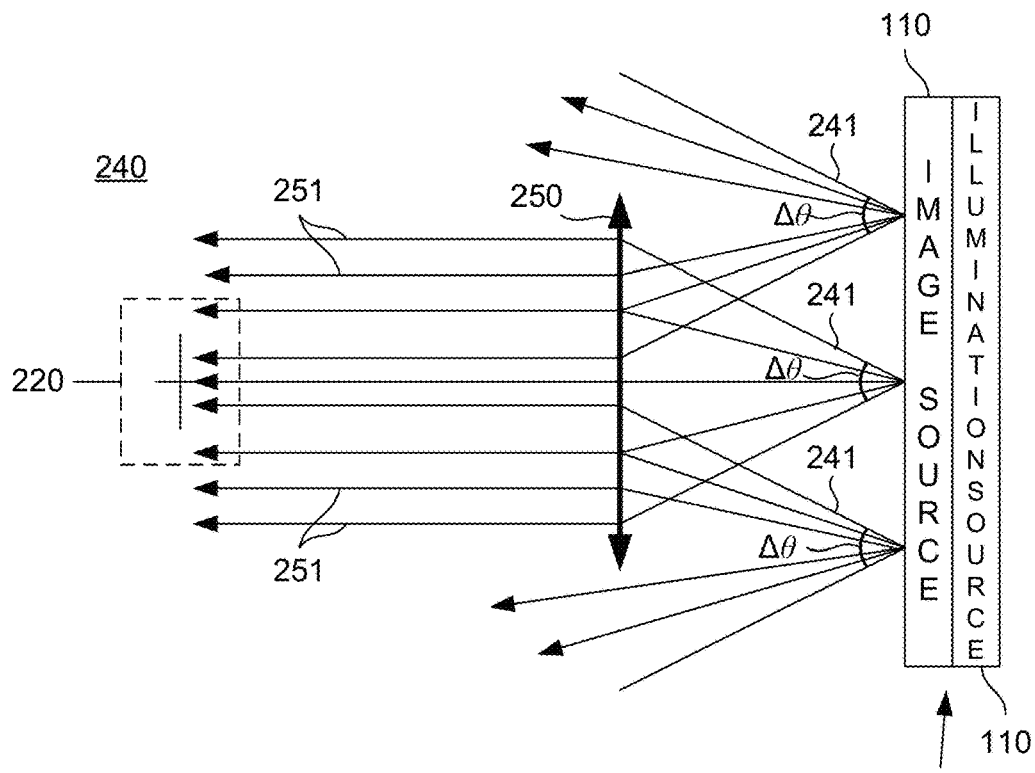

FIGS. 2A and 2B schematically show light paths for two examples of wearable display configurations using a display device 110 of FIG. 1B.

As shown in FIG. 2A, the display system 200 includes a display device 110 and an optical component. The example of FIG. 2A schematically illustrates light travelling in a wearable AR display system 200. As shown in FIG. 2A, a synthetic image 201 is created using the display device 100 whose emitted light 212 is redirected by an at least partially transparent optical component 210 into the eye box 220 corresponding to the location of an eye of a user of the system 200. The display device 110 is positioned relative to the user and the optics system 210 so that different regions of the display device 110 are viewed with each eye to generate a perspective view of the synthetic image by each eye.

In an example of a wearable AR device, the optical component 210 is sufficiently transparent to allow the user to directly view the real-world environment beyond of the optical component 210. In one example, the optical component 210 is a combiner-imager. The combiner-imager overlays the view of the user's environment with a synthetic image generated by the display device 110 to provide what is commonly known as an AR display. If the combiner-imager is made opaque to the external or real-world environment, the display is referred to as a VR display. In some embodiments, the combiner-imager is shaped to provide an optical power (e.g., by having a suitably curved surface) such that an image provided to a viewer of the display system appears or is perceived at a desired viewing distance. Different portions of the display device are viewed by each eye, with or without overlap between them. As a result, the image projected to each eye can be controlled independently by the display system 200 to generate a desired perspective view.

In the interest of brevity, the following description generally mentions a single display device 110 and optical component 210. However, one skilled in the art will appreciate this configuration is exemplary and that other system configurations may be implemented. For example, although the optical component 210 is shown above as a single combiner-imager in FIGS. 2A and 2B, a separated optics system may be provided for each eye (e.g., a visor or goggles with separate reflective image areas or apertures for each eye and/or glasses with a separate combiner imager or lens for each eye). Similarly, a separate display device 100 also may be provided for each eye or a single display device divided to show a separate image to each eye.

As can be seen from the configuration in FIG. 2A, the main light rays that are viewed by a wearer of the system are not normal with respect to the display device. For example, the light ray 230 forms an oblique viewing angle θ with respect to a line 235 that is normal to a surface to the display device 100 emitting the light 230. As a result, the brightness of the main optical rays that are viewed by a user are dimmer than the emitted rays that are normal to the display device (e.g., as illustrated by the graph shown in FIG. 1C). One skilled in the art will appreciate that the positioning and/or orientation of the display device 110 shown in FIG. 2A is exemplary, and may be varied in any particular implementation while still providing an oblique viewing angle θ for the main light rays viewed by a user.

FIG. 2B illustrates another example of a wearable VR display system 240. In one example, the system 240 includes a display device 110 arranged to emit light 241 towards an optical component 245. As shown in FIG. 2B, a virtual image is created using a display device 110 of which a portion of the emitted light 241 passes through the optical component 245 (e.g., a lens) and is directed into the eye box 220 corresponding to the location of an eye of a user of the system 240 where the light is perceived as an image. As shown in FIG. 2B, the display device 100 has a relatively wide or broad viewing angle Δθ (e.g., from −50, 50 degrees) for a user of the system 240.

In the examples shown in FIGS. 2A and 2B, the optical components may reflect, collect, or direct significantly less than all the light emitted from the display device 100 thereby providing a degraded or non-optimal performance with respect to the image generated by the display device as viewed by a user. For example, the optical component 210 may collect or reflect around (−5, 45) degrees of the viewing angle of the display device 100. As shown in FIG. 2B, a significant amount of light (e.g., rays 250) from the display is not directed to the eye box 220 and is lost.

Enhanced Display for Wearable AR and VR Systems

The following description provides enhanced wearable display systems offering a superior visual experience for viewers of the system. The display systems include various system components to implement one or more of: redirecting the maximal brightness of a display device towards the center of the eye-box of a user; selectively narrowing the viewing angle of light emitted by the display device; and by spatially optimizing the backlight of the display device based on the specification of the wearable optical system thereby optimizing and/or maximizing the amount of light entering the eye for a range of gaze rotation of a user of the wearable display system. In one example, the following description provides a display device including a light optimizing or directing layer. The light optimizing layer includes one or more films that optimize the amount of light directed to the eye box of a user of the wearable display system. The light optimizing layer may include one or more films positioned to direct light from the image source and illumination source in a desired manner. In one example, a direction-turning film (DTF) is provided to turn and/or direct the main rays of light passing through the film. In another example, a brightness enhancing film (BEF) is provided to focus or narrow the range of viewing angles of light passing through the film. Additional examples include use of both DTF and BEFs.

The following examples describe various microfilms and visual components in relation to each other. The corresponding depictions of these elements are illustrative and may not be to scale or provide exact geometries but are provided to aid the reader in understanding the various descriptions, configurations, concepts, and models provided herein.

Figure 3A:
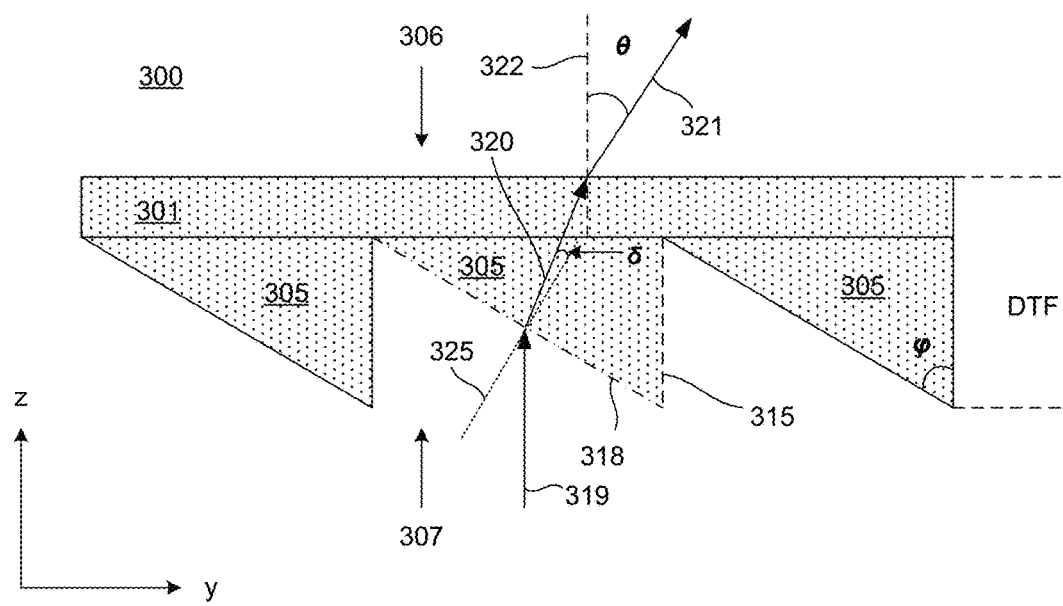
FIG. 3A is an example of a direction-turning film used in a wearable display system.

FIG. 3A is an example of a cross section in the z-y plane of a DTF 300 of the display device of an AR or a VR display system. The DTF 300 is generally a planar structure having a specified thickness formed of a transparent film. In some examples, the film may be formed of transparent plastic using one or more of a polycarbonate, acrylic, or poly (methyl methacrylate) (PMMA).

As shown in FIG. 3A, the film 300 includes at least a substrate 301 and micro-prism structure 305 formed thereon. As shown in FIG. 3A the substrate 301 and micro-prism structure 305 are formed of the same transparent material. However, in some examples, the substrate 301 and micro-prism structure 305 may be formed of different transparent materials. The film 300 has at least two opposite sides or surfaces 306 and 307. The substrate 301 includes one substantially smooth, planar exterior surface on one side 306 of the film (e.g., in the x-y plane). The micro-prism structure 305 consists of a number of parallel grooves or notches formed in a surface of the film above the substrate layer 301 on an opposite side 307 of the film 300. The grooves or notches may be carved or etched in the surface of the film 300 to create the micro-prism structure. In one example, the grooves or notches have a triangular cross section in the z-y plane perpendicular to the surface of the substrate in the x-y plane. In some examples, the triangles formed by the cross section along the length of the y dimension of the film create a "saw-tooth pattern" of right triangle prisms. One example of such a triangular prism 315 includes a hypotenuse surface 318 that bends or refracts light (represented by the arrows 319, 320, and 321) passing through the film 300 to turn the direction of the light passing through the film. The turning angle $\theta$ of the light direction (the angle formed between a surface normal 322 of the substrate and the bent or refracted ray 321) depends on the prism angle $\varphi$ of the triangular prism 315. For example, $\theta = \alpha \sin(n_f \cos(\varphi + \delta))$, where $\sin \delta = (\cos \varphi)/n_f$, where $n_f$ is the refractive index of the direction-turning film and $\delta$ is the angle formed by the refracted ray 320 and the surface normal 325 of the prism 315, as shown in FIG. 3A. In some examples, the turning angle $\theta$ is selected to correspond with the optical properties of the optical component of the AR or VR display system such that optical component directs a main ray of the light emitted from the display device at a corresponding eye of the user, as explained in further detail below. In one example, turning angles $\theta$ of 20-55° may be used according to a corresponding portion of the paired optical component. In one example, the film 300 may have a thickness of 25-100 μm. A single light ray (e.g., 319, 320, and 321) is shown in FIG. 3A for conciseness and ease of explanation. In any particular application, a film 300 is capable of directing a plurality of rays from an illumination source.

Figure 3B:
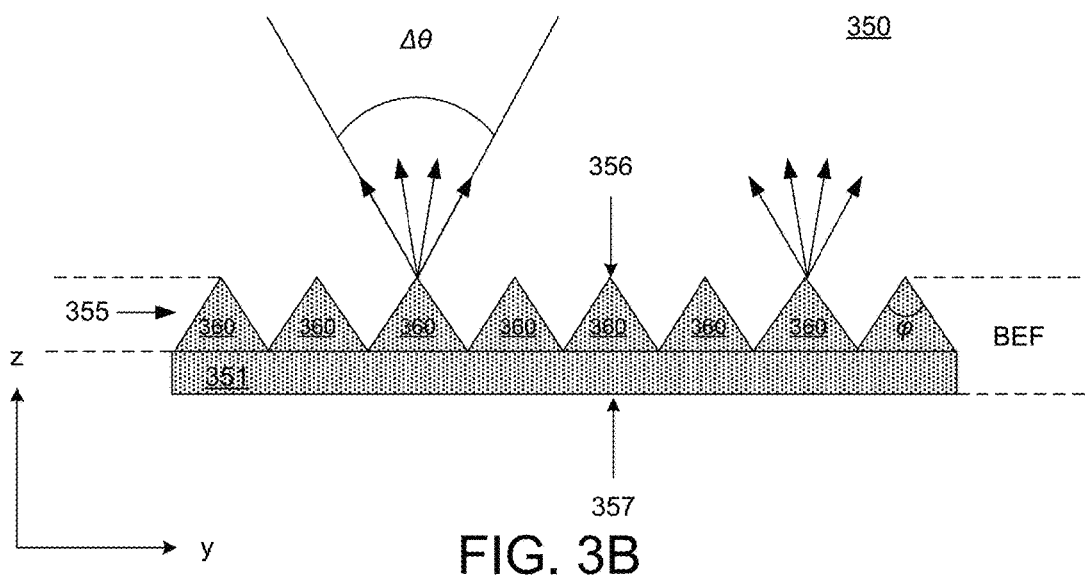
FIG. 3B is an example of a brightness enhancing film used in a wearable display system.

FIG. 3B is an example of a cross section in the z-y plane of a BEF 350 of the display device of an AR or a VR display system. The BEF 350 is generally a planar structure having a specified thickness formed of a transparent film. In some examples, the film may be formed of transparent plastic using one or more of a polycarbonate, acrylic, or poly (methyl methacrylate) (PMMA).

As shown in FIG. 3B the substrate 351 and micro-prism structure 355 are formed of the same transparent material. However, in some examples, the substrate 351 and micro-prism structure 355 may be formed of different transparent materials. The film 350 has at least two opposite sides or surfaces 356 and 357. The substrate 351 includes one substantially smooth, planar exterior surface on one side 356 of the film (e.g., in the x-y plane). The micro-prism structure 355 consists of a number of parallel grooves or notches formed in a surface of the film above the substrate layer 351 on an opposite side 357 of the film 350. The grooves or notches may be carved or etched in the surface of the film to create the micro-prism structure. In one example, the grooves or notches have a triangular cross section in the z-y plane perpendicular to the surface of the substrate in the x-y plane. In some examples, the triangles formed by the cross section along the length of the y dimension of the film create a "saw-tooth pattern" of isosceles triangle prisms. The prisms focus or narrow the range of viewing angles $\Delta\theta$ of a beam of light passing through the film. The compressed beam increases brightness along a narrower range of viewing angles of the light emitted by the display device. The range of viewing angles $\Delta\theta$ depends on the prism angle $\varphi$ of the triangular prisms 360 and the refractive index of the film of the microstructure 355. The larger the refractive index of the material forming the film the smaller $\Delta\theta$. The larger the prism angle $\varphi$ the larger the range of view angles $\Delta\theta$. In one example, the prism angle $\varphi$ is selected to provide a range of viewing angles $\Delta\theta$ that corresponds to the optical component of the system, as explained in further detail below. For example, $\Delta\theta$ can be formed in the film such that the range of angles is large enough to cover gaze rotation and the inter-pupillary distances and eye locations of various users so that there is always an image present for an eye-box corresponding to a wearer of the display system. In one example, a range of viewing angles $\Delta\theta$ of 35° may be used according to the paired optical component.

Figure 4A:
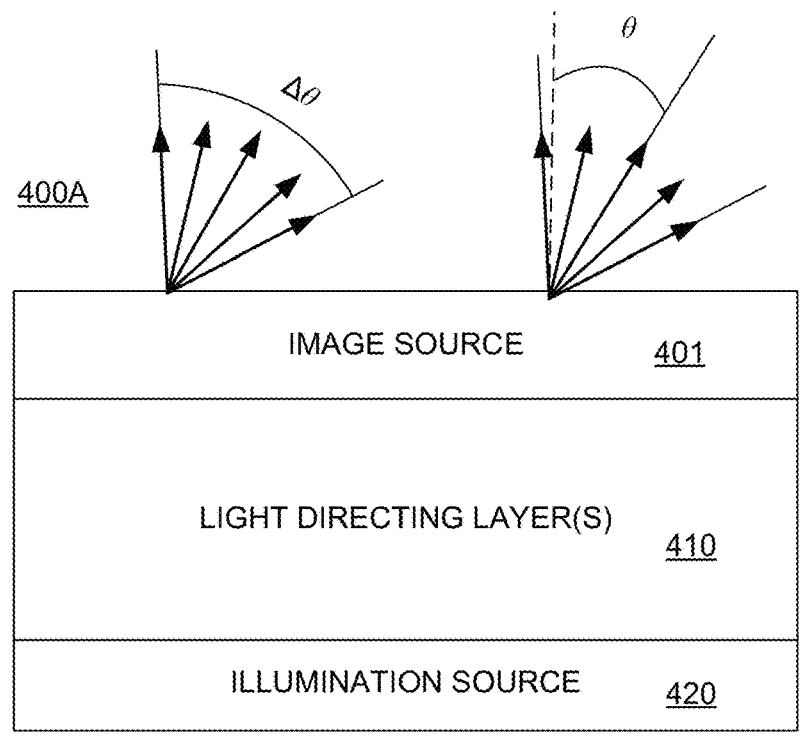
FIGS. 4A, 4B, and 4C are examples of configurations of display devices of a wearable display system.
Figure 4B:
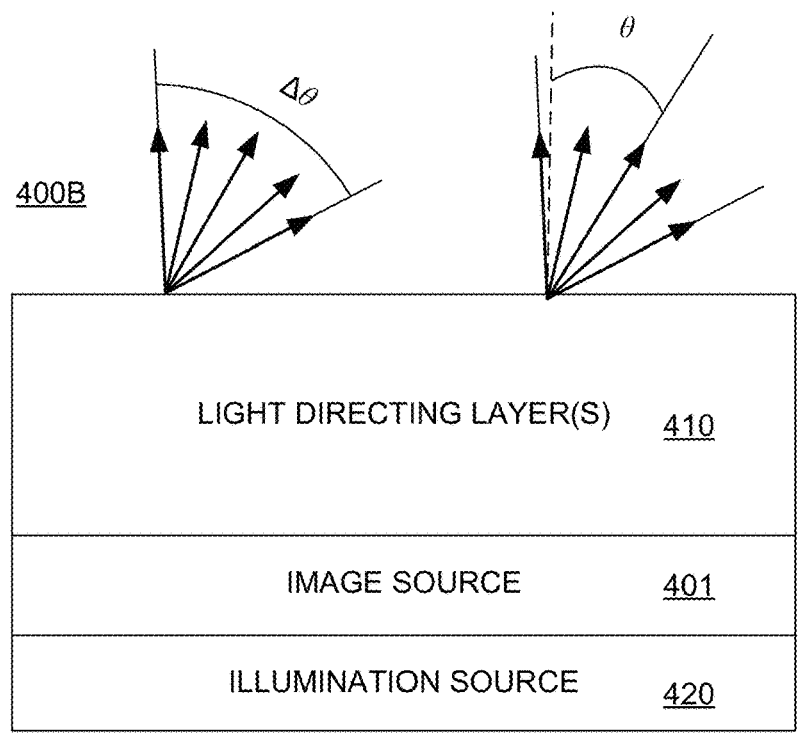
Figure 4C:
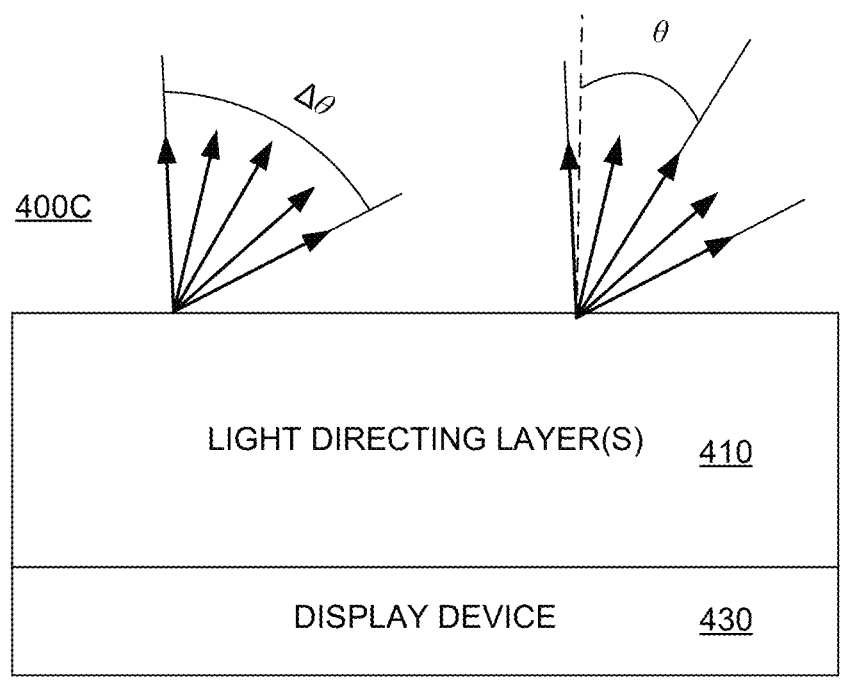

FIGS. 4A, 4B, and 4C show examples of the structures 400A, 400B, and 400C of a display device of an AR or VR display system. In some examples, as shown in FIGS. 4A and 4B, the structures 400A and 400B include an image source 401, a light directing layer 410, and an illumination source 420. In some examples, as shown in FIG. 4C, the structure 400C includes a light directing layer 410 and a self-illuminating image source 430.

As shown in FIGS. 4A and 4B an image source 401 is provided. For example, the image source 401 may be a film including a two-dimensional array that is electronically controlled to generate a two-dimensional image (e.g., by the output from a graphics or other processing system such as processing device 101). In some examples, the image source may be may be a liquid crystal array, such as a thin-film-transistor liquid-crystal display (TFT LCD). Of course, one skilled in the art will appreciate that the image source 111 also can be implemented with other transmission or reflection technologies, such as those described above.

In addition, an illumination source 420 is provided to illuminate the image source 401 so that the display device emits light to project the image from the image source to a viewer of the display device. In one example, the illumination source 420 may be a backlight including a light source, such as, for example, cold cathode fluorescent lamps (CCFLs), an edge-lit white light emitting diodes (EL-WLEDs); white light emitting diodes WLEDs; and a red, green, blue light emitting diodes (RGBLED).

As shown in FIG. 4C, a self-illuminating image source 430 is provided. For example, the image source 430 may be implemented using an organic light emitting diode (OLED) two-dimensional array that is electronically controlled to generate a two-dimensional image (e.g., by the output from a graphics or other processing system such as processing device 101).

The structures 400A, 400B, and 400C also include a light directing layer 410. The light directing layer 410 includes one or more layered thin films (e.g., DTFs and/or BEFs) to direct and/or shape the light emitted by the display device. As shown in FIG. 4A, the structure 400A includes a light directing layer 410 placed between the image source 401 and the illumination source 420 to direct and/or shape light from the illumination source 420 passing through the light directing layer 410 to illuminate and/or backlight the image source 401. As shown in FIG. 4B, the structure 400B includes a light directing layer 410 placed adjacent to and/or on a surface of the image source 401 to direct and/or shape light passing through the image source 410 from the illumination source 420 illuminating and/or backlighting the image source 401. As shown in FIG. 4C, the structure 400C includes a light directing layer 410 placed adjacent to and/or on a surface of the self-illuminated image source 430 to direct and/or shape light emitted from self-illuminated image source 430.

In one example, the light directing layer 410 includes one or more DTFs, such as those described above with regard to FIG. 3A. Each DTF has one or more turning angles θ to turn the angle of the light passing through the layer and direct light emitted from the display device according to a paired optical element of a corresponding wearable display system. For example, the turning angle of any portion of the film may be selected according to the prescription, curvature, and/or configuration of the optical element to "normalize" the viewing angle of light projected into the eye box of a user. In one example, a DTF has multiple turning angles. For example, the DTF may include a first region having a first turning angle and a second region having a second turning angle that is different from the first region. Of course, three or more such regions may be formed in the DTF. The turning angle of each region may be matched to a portion of the optical component projecting light received from the region to the eye box of a user of the AR or VR display system such that the main ray (and/or light thereabout) of the light beam is turned by the light directing layer to be directed to the eye box of the user upon transmission by the corresponding portion of the optical element.

In one example, the light directing layer 410 includes two DTFs, such as those described above with regard to FIG. 3A. In this example, each DTF is arranged to turn light in one spatial dimension of the system (e.g., an x dimension or a y dimension that are orthogonal to each other).

In another example, the light directing layer 410 includes one or more BEFs, such as those described above with regard to FIG. 3B. Each BEF may have one or more ranges of viewing angles Δθ to focus the light passing through the layer and compress the beam of light emitted from the display device according to the prescription, curvature, and/or configuration of the optical component of a corresponding wearable display system to increase, optimize, and/or maximize the amount of light directed to the eye box of the user upon transmission by the corresponding portion of the optical element. In one example, a BEF has multiple ranges of viewing angles Δθ. For example, the BEF may include a first region having a first viewing angle and a second region having a second viewing that is different from the first region. Of course, three or more such regions may be formed in the BEF. The turning angle of each region may be matched to a portion of the optical component.

In one example, the light directing layer 410 includes two BEFs. In this example, each BEF is arranged to compress the beam of light in one spatial dimension of the system (e.g., an x dimension or a y dimension that are orthogonal to each other).

In another example, the light directing layer 410 includes both DTFs and BEFs as described above. For example, the light directing layer may include two DTFs and two BEFs.

One skilled in the art will appreciate that the structure 400 shown in FIG. 4 is exemplary to illustrate and/or or highlight certain aspects, and that not all components of a display device of an AR or VR display system are shown. For example, a display device may include additional components, such as, for example, housing components, connectors, a power supply, interfaces, adapters, and controllers, to name a few; however, these components are well understood by those skilled in the art and for sake of brevity and clarity are not described in further detail with regard to FIGS. 4A, 4B, and 4C.

Figure 5A:
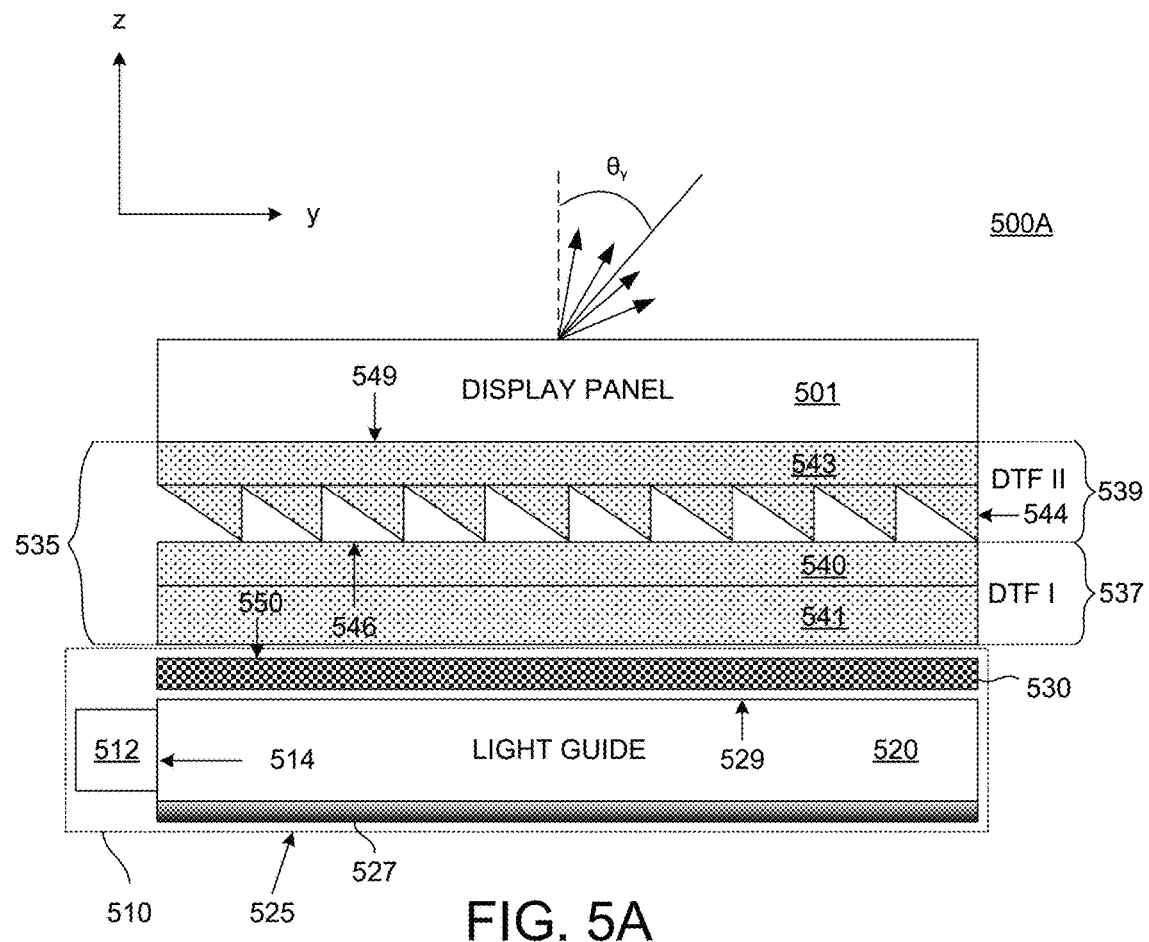
FIGS. 5A, 5B, and 5C are examples of a cross section of the structure of the light directing layer and display device of FIG. 4A.
Figure 5B:
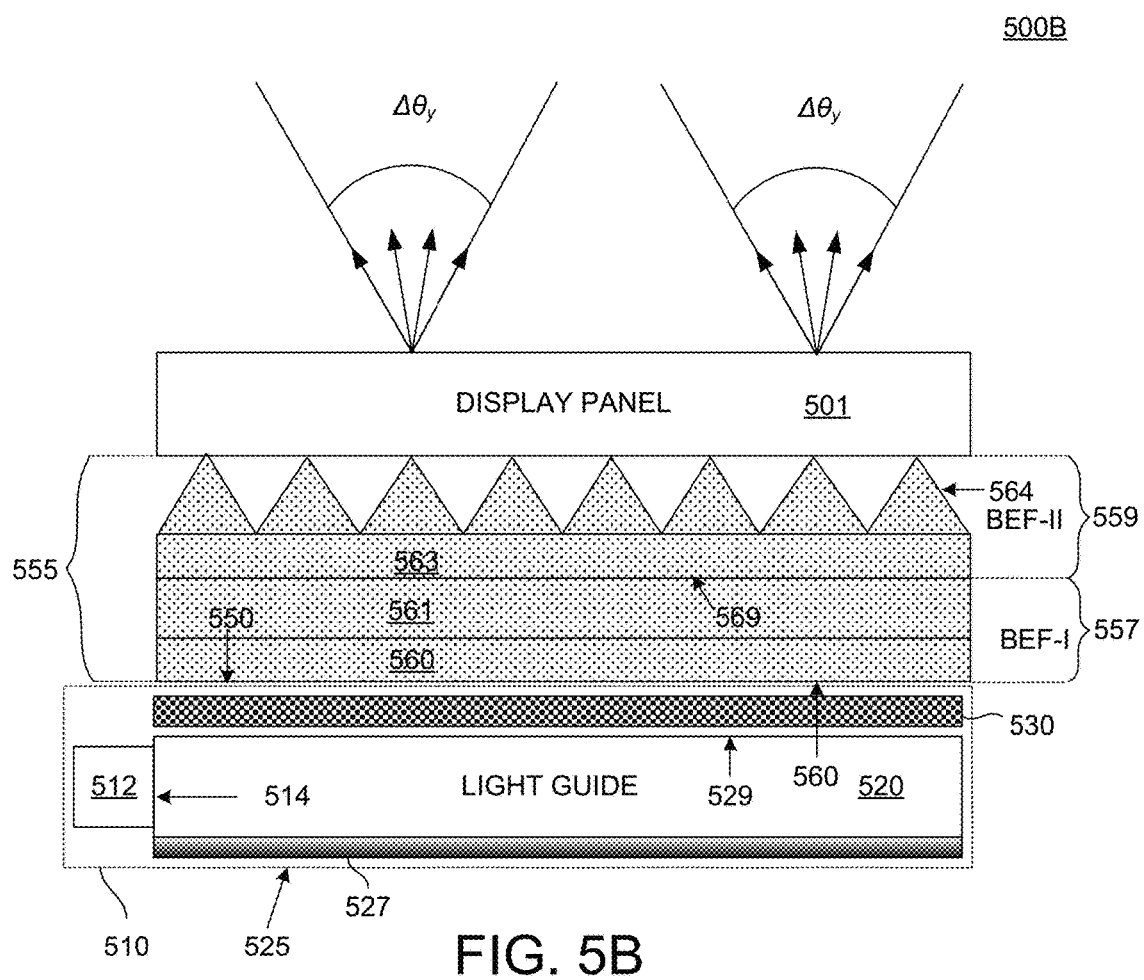
Figure 5C:
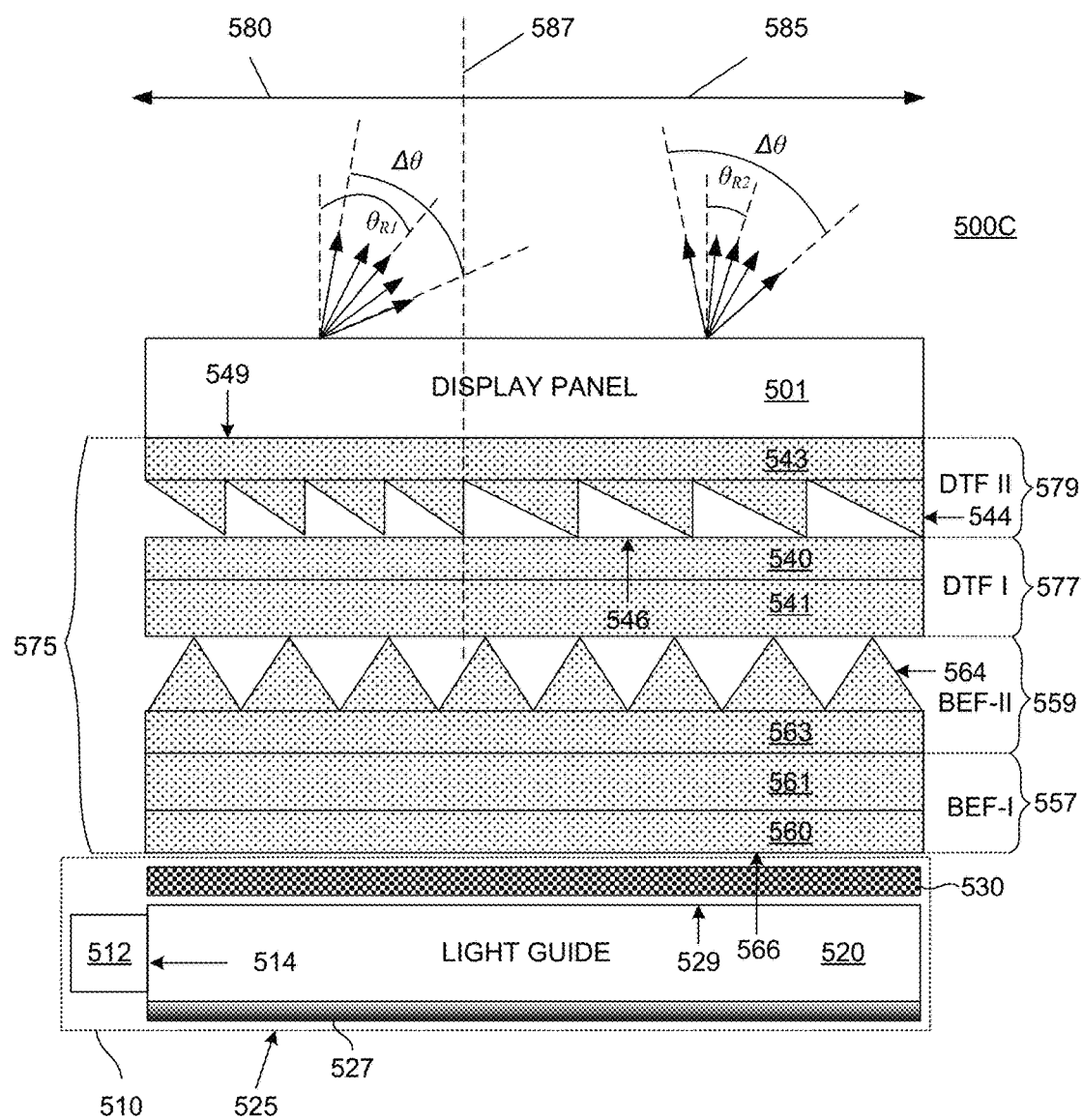

FIGS. 5A, 5B, and 5C are side views of a cross section of examples of the structure in the y-z plane of a display device of FIG. 4A.

As shown in FIGS. 5A, 5B, and 5C, the image source may be implemented using a display panel. In one example, the display panel 501 may be a film including a two-dimensional array of liquid crystal pixels where the transmission of each pixel from the source is electronically controlled to generate a two-dimensional image (e.g., by the output from a graphics or other processing system, such as processing device 101).

As shown in FIGS. 5A, 5B, and 5C, the illumination source 420 may implemented as a backlight 510. For example, the backlight 510 includes at least one light source 512 (e.g., an array of LEDs) arranged along one edge 514 of the backlight 510. The light source 512 is positioned adjacent to a light or waveguide 520 to direct the light from the source 512 at the display panel 501. Coating or positioned along one surface 525 of the waveguide 520 is a reflective or mirrored film 527 (e.g., an Enhanced Specular Reflector (ESR)) arranged to reflect light from the light source 512. Arranged along a surface 529 of the waveguide 520 opposite the reflective film is a diffuser 530. The diffuser 530 diffuses light emitted from the waveguide 520 to provide light having a uniform and/or homogenous appearance. Light emitted from the diffuser 530 is provided to the light directing layer 535.

As shown in FIG. 5A, the light directing layer 535 includes two DTFs 537 and 539 (e.g., DTF I and DTF II). In one example, DTF I and DTF II are generally planar structures parallel to the x-y plane. DTF I includes a substrate 540 and a micro-prism structure 541, and DTF II includes a substrate 543 and a micro-prism structure 544, for example, as described above with regard to FIG. 3A. Each DTF includes at least two opposite sides, such as a substrate side and a microstructure side. For example, DTF I has a substrate 540 with a surface 546 on the substrate side of the DTF I, and the micro-prism structure 541 arranged on the substrate 540 opposite the substrate surface 546 on the microstructure side of the DTF I. Similarly, DTF II has a substrate 543 with a surface 549 on the substrate side of the DTF 2, and the micro-prism structure 544 on the substrate 543 opposite the surface 549 on the microstructure side of the DTF II. The micro-structure side of DTF I is arranged on a surface of the backlight 510 that emits light, such as, for example on the outward facing surface 550 of the diffuser 530. The microstructure side of DTF II is arranged on the substrate surface 546 of the DTF I.

In the example shown in FIG. 5A, the micro-prism structures of each DTF are arranged orthogonal to each other. For example, DTF I includes a number of grooves or notches arranged parallel to the y dimension, and DTF II includes a number of grooves or notches arranged parallel to the x dimension. As a result, DTF II turns light according to a turning angle θ in the x dimension, and DTF I turns light according to a turning angle $θ_y$ in the y dimension, where the x and y dimensions are orthogonal to each other. The prism angle $φ_i$ of each prism i of the DTFs I and II, determines the turning angle at corresponding location of each prism in the film. As the light passes through DTF I-, it is turned at a viewing angle in a first dimension, and then as the light passes through DTF II, it is turned at a viewing angle in a second dimension orthogonal to the first. In some examples, the prism angles of the microstructures (and thereby the turning angles) are selected and/or optimized according to the optical system for which the display device is paired, as described in further detail below.

Turning to FIG. 5B, a light directing layer 555 includes two BEFs 557 and 559 (e.g., BEF I and BEF II). In one example, BEF I and BEF II are generally planar structures. BEF I includes a substrate 560 and a micro-prism structure 561, and DTF II includes a substrate 563 and a micro-prism structure 564, for example, as described above with regard to FIG. 3B. Each BEF includes at least two opposite sides, such as a substrate side and a microstructure side. For example, BEF I has a substrate 560 with a surface 566 on the substrate side of the BEF I, and the micro-prism structure 561 arranged on the substrate 560 opposite the substrate surface 566 on the microstructure side of the BEF I. Similarly, BEF II has a substrate 563 with a surface 569 on the substrate side of the BEF II, and the micro-prism structure 564 on the substrate 563 opposite the surface 569 on the microstructure side of the BEF II. The substrate surface 566 BEF I is arranged on a surface of the backlight 510 that emits light, such as, for example on the outward facing surface 550 of the diffuser 530. The substrate surface 569 of BEF II is arranged on the microstructure side of the BEF I.

In the example shown in FIG. 5B, the micro-prism structures of the BEFs are arranged orthogonal to each other. For example, BEF I includes a number of grooves or notches arranged parallel to the y dimension, and BEF II includes a number of grooves or notches arranged parallel to the x dimension. For example, BEF I compresses light according to range of viewing angles $Δθ_x$ along the x dimension, and BEF II compresses light according to range of viewing angles $Δθ_y$ in the y dimension, where the x and y dimensions are orthogonal to each other. The prism angle φ of each prism of the BEFs I and II determines range of viewing angles Δθ. As the light passes through BEF I, it is narrowed to a range of viewing angles in a first dimension, and then as the light passes through BEF II, it is narrowed to a range of viewing angles in a second dimension orthogonal to the first. In some examples, the viewing angles are selected and/or optimized according to the optical system for which the display device is paired, as described in further detail below.

As shown in FIG. 5C, the light directing layer 575 includes two DTFs 577 and 579 (e.g., DTF 1 and DTF II) and two BEFs 557 and 559 (e.g., BEF I and BEF II). In one example, BEF I and BEF II are generally planar structures. BEF I includes a substrate 560 and a micro-prism structure 561, and DTF II includes a substrate 563 and a micro-prism structure 564, for example, as described above with regard to FIG. 3B. Each BEF includes at least two opposite sides, such as a substrate side and a microstructure side. For example, BEF I has a substrate 560 with a surface 566 on the substrate side of the BEF I, and the micro-prism structure 561 arranged on the substrate 560 opposite the substrate surface 566 on the microstructure side of the BEF I. Similarly, BEF II has a substrate 563 with a surface 569 on the substrate side of the BEF II, and the micro-prism structure 564 on the substrate 563 opposite the surface 569 on the microstructure side of the BEF II. The substrate surface 566 BEF I is arranged on a surface of the backlight 510 that emits light, such as, for example on the outward facing surface 550 of the diffuser 530. The substrate surface 569 of BEF II is arranged on the microstructure side of the BEF I.

As shown in FIG. 5C, BEF I is arranged on a surface of the backlight or diffuser emitting light from the light source. BEF II is arranged on a second surface of the BEF I. In the example shown in FIG. 5C, the micro-prism structures of the BEFs are generally planar structures arranged orthogonal to each other. For example, BEF I includes a number of grooves or notches arranged parallel to the y dimension, and BEF II includes a number of grooves or notches arranged parallel to the x dimension. For example, BEF I compresses light according to range of viewing angles Δθx along the x dimension, and BEF II compresses light according to range of viewing angles Δθy in the y dimension, where the x and y dimensions are orthogonal to each other. The prism angle φ of each prism of the BEFs I and II determines range of viewing angles Δθ. As the light passes through BEF I, it is narrowed to a range of viewing angles in a first dimension, and then as the light passes through BEF II, it is narrowed to a range of viewing angles in a second dimension orthogonal to the first. In some examples, the viewing angles are selected and/or optimized according to the optical system for which the display device is paired, as described in further detail below.

As shown in FIG. 5C, the light directing layer 575 includes two DTFs 577 and 579 (e.g., DTF I and DTF II). DTF I and DTF II are generally planar structures parallel to the x-y plane. DTF I includes a substrate 540 and a micro-prism structure 541, and DTF II includes a substrate 543 and a micro-prism structure 544, for example, as described above with regard to FIG. 3A. Each DTF includes at least two opposite sides, such as a substrate side and a microstructure side. For example, DTF I has a substrate 540 with a surface 546 on the substrate side of the DTF I-, and the micro-prism structure 541 arranged on the substrate 540 opposite the substrate surface 546 on the microstructure side of the DTF I. Similarly, DTF II has a substrate 543 with a surface 549 on the substrate side of the DTF 2, and the micro-prism structure 544 on the substrate 543 opposite the surface 549 on the microstructure side of the DTF II. The microstructure side of DTF I is arranged on the micro-prism side of BEF. The microstructure side of DTF II is arranged on the substrate surface 546 of the DTF I.

In the example shown in FIG. 5C, the micro-prism structures of each DTF are arranged orthogonal to each other. For example, DTF I includes a number of grooves or notches arranged parallel to the y dimension, and DTF II includes a number of grooves or notches arranged parallel to the x dimension. As a result, DTF II turns light according to a turning angle θx in the x dimension, and DTF I turns light according to a turning angle θy in the y dimension, where the x and y dimensions are orthogonal to each other.

As shown in FIG. 5C, the DTF I and II include two regions R1 and R2, for example, regions 580 and 585 divided by line 587. Each region R1 and R2 includes micro-prisms having different prism angles, for example, $\varphi_{R1}$ and $\varphi_{R2}$. As a result, region R1 turns light according to a turning angle $\theta_{R1}$ and region R2 turns light according to a turning angle $\theta_{R2}$. The prism angle $\varphi$ of each region of the DTFs I and II, determines the turning angle at corresponding location of the display panel. Each region R1 and R2 may be selected to direct light emitted from panel to a corresponding region of an optical element or component of an AR or VR display system, as explained in greater detail below.

Although the example in FIG. 5C shows two regions, R1 and R2, one skilled in the art will appreciate that three or more regions may be provided in any one implementation according to the description herein. One skilled in the art will also appreciate that the order of the film layers may be varied with in light directing layer. In addition, the length of any region (e.g., the number of micro-prisms within a region) may vary from region to region. The orientation of the micro-prisms may also be varied by region. For example, the hypotenuse of the right triangles of the micro-prism structure of a DTF may be oriented in one region to turn light in one direction along a dimension with regard to a surface normal (e.g., +θ) and, the hypotenuse of the right triangles of the micro-prism structure of the DTF may be oriented in another region to turn light in an opposite direction along the dimension with regard to a surface normal (e.g., −θ). In particular, the number and length of regions may be selected based on the corresponding optical element or component of an AR or VR display system and the desired precision to which the display is spatially tuned and/or optimized by the light directing films. In one example, the number and length of regions may be selected with respect to the corresponding optical element, such that as much of the light emitted from the display device is collected by eye-box of a wearer of the display system.

Although FIGS. 5A, 5B, and 5C illustrate the structure 400A of FIG. 4A in further detail, the description of the light directing layers 535, 555, and 575 are also applicable to structures 400B and 400C. For example, the layers 535, 555, or 575 may be placed adjacent to and/or on an outward facing surface of the display panel 501 and the display panel is positioned adjacent to the backlight 510 to achieve the display structure of 400B. Similarly, the display panel 501 and backlight 510 may be replaced with a self-illuminating OLED display in which the layers 535, 555, or 575 are placed adjacent to and/or on an outward facing surface of the OLED display to achieve the display structure of 400C.

Figure 6A:
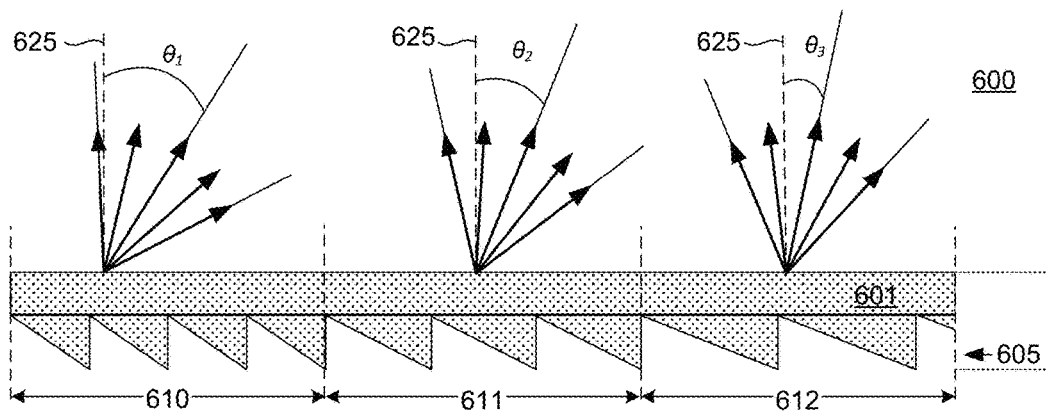
FIGS. 6A, 6B, and 6C are additional examples of films for a light directing layer.
Figure 6B:
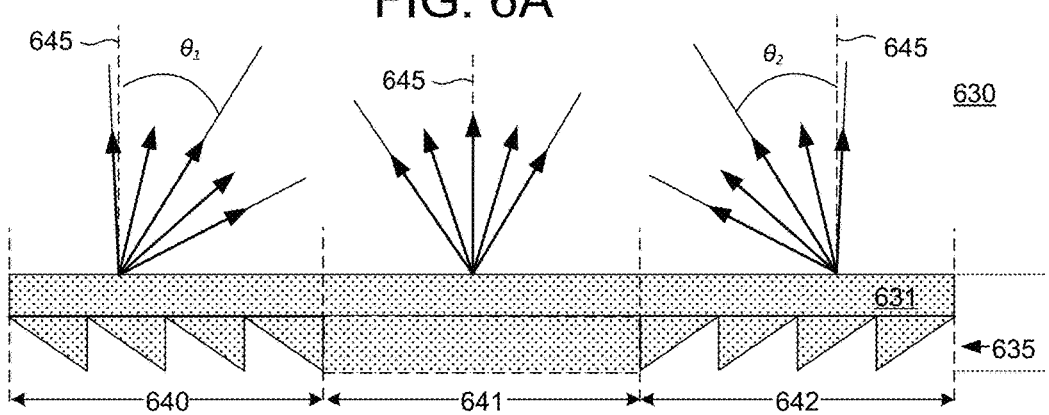
Figure 6C:
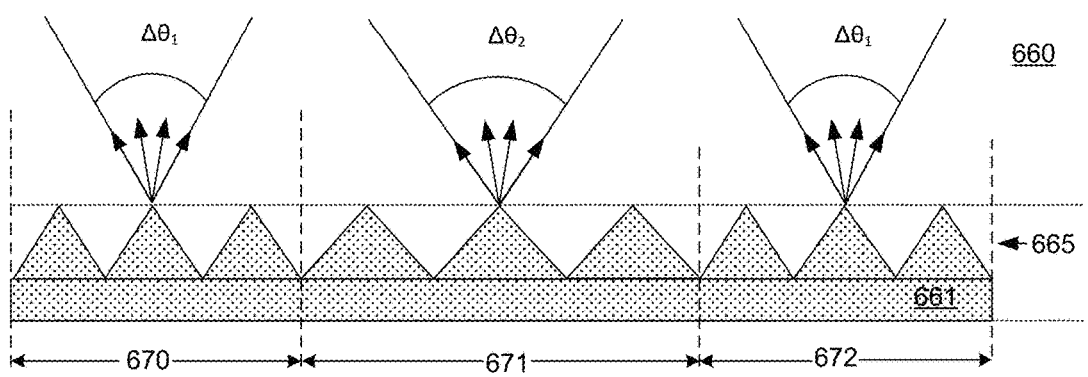

Many different combinations of configurations of the DTF and the BEF are possible by varying the micro-prism structure of the films. For example, the micro-structure layer may be formed to include different regions or portions having different micro-prisms including number, size, and orientation of the micro-prisms to provide a desired turning direction or shaping properties to specify the desired characteristics of any particular region. In addition, one or more regions of a film also may include no micro-prism structure (i.e., a region without grooves or notches). Some examples of various configurations are shown in FIGS. 6A, 6B, and 6C; however, such examples are illustrative and not exhaustive. For example, FIGS. 6A, 6B, and 6C show side views of a cross section of examples of the structure of the in the y-z plane of various thin films (e.g., DTFs and BEFs) for use in a light directing layer of a display device.

FIG. 6A shows a DTF 600 that includes multiple turning regions. The DTF 600 includes a substrate 601 and a micro-prism structure 605. The micro-prism structure 605 consists of a number of parallel grooves or notches formed in a surface of the film. The grooves or notches may be carved or etched in the surface of the film 600 to create the micro-prism structure. In one example, the grooves or notches have a triangular cross section in the z-y plane. The triangles formed by the cross section along the length of the y dimension of the film create a "saw-tooth pattern" of right triangle prisms. As shown in FIG. 6A, the DTF is divided into multiple portions or regions 610, 611, and 612. Each region includes a different micro-prism structure. For example, the micro-prism structure in region 610 includes a plurality of right triangular prisms having prism angle $\varphi_1$. The micro-prism structure in region 611 includes a plurality of right triangular prisms having prism angle $\varphi_2$. The micro-prism structure in region 612 includes a plurality of right triangular prisms having prism angle $\varphi_3$. Each of the regions 610, 611, and 612 bends or refracts light (represented by the arrows 619, 620, and 621) passing through the film 600 to turn the direction of the light passing through the film 600. Each region directs light passing through the region at a different turning angle (e.g., $\theta_1$, $\theta_2$, and $\theta_3$) corresponding to the prism angle $\varphi$ of the corresponding micro-prism structure of the region. For example, region 610 turns light corresponding to the main ray of a beam of light passing through the region 23° with respect to surface the surface normal 625, region 611 turns light corresponding to the main ray of a beam of light passing through the region 20° with respect to surface the surface normal 625, region 612 turns light corresponding to the main ray of a beam of light passing through the region 18° with respect to surface the surface normal 625. In some examples, the turning angle θ of each region is formed, selected, and or matched to correspond with the optical properties of a corresponding region of the optical component of the AR or VR display system such that optical component directs a main ray of the light emitted from the display device at a corresponding eye of the user.

FIG. 6B shows a DTF 630 that includes multiple turning regions and a non-turning region. The DTF 600 includes a substrate 631 and a micro-prism layer 635. The micro-prism layer 635 includes a plurality of regions with a number of parallel grooves or notches formed in a surface of the film. The grooves or notches may be carved or etched in the surface of the film 630 to create a micro-prism structure. In one example, the grooves or notches have a triangular cross section in the z-y plane. In addition, a portion of the micro-prism layer 635 is formed without any microstructure prism, grooves, or notches providing two substantially smooth surfaces.

As shown in FIG. 6B, the DTF is divided into multiple portions or regions 640, 641, and 642. Each region includes a different micro-prism structure and affects light passing through the film differently. In this example, the micro-prism structures in regions 640 and 642 include a plurality of right triangular prisms having a prism angle $\varphi$; however, the orientation of the right triangles in each region 640 and 642 mirror each other. For example, the hypotenuse of the right triangles of the micro-prism structure in region 640 is oriented to turn light in one direction along the y dimension with regard to a surface normal 645 (e.g., $+\theta_y$) and the hypotenuse of the right triangles of the micro-prism structure in region 642 is oriented to turn light in an opposite direction along the y dimension with regard to a surface normal 645 (e.g., $-\theta_y$) corresponding to the prism angle $\varphi$ of the right triangular grooves that form the corresponding micro-prism structure of the region. For example, region 640 turns light corresponding to the main ray of a beam of light passing through the region +23° with respect to surface the surface normal 645 and region 642 turns light corresponding to the main ray of a beam of light passing through the region −23° with respect to surface the surface normal 645. The region 641 does not include any micro-prisms. For example, the region 641 has a uniform thickness and flat surfaces on both sides of the film 630 and does not turn light passing through in relation to the surface normal.

FIG. 6C shows a BEF 660 that includes multiple shaping regions. The BEF 660 includes a substrate 661 and a micro-prism layer 665. The micro-prism layer 665 consists of a number of parallel grooves or notches formed in a surface of the film. The grooves or notches may be carved or etched in the surface of the film 660 to create a micro-prism structure. In one example, the grooves or notches have a triangular cross section in the z-y plane. The triangles formed by the cross section along the length of the y dimension of the film create a "saw-tooth pattern" of isosceles triangle prisms. As shown in FIG. 6C, the BEF is divided into multiple portions or regions 670, 671, and 672. Each region includes a different micro-prism structure. For example, the micro-prism structure in region 670 includes a plurality of isosceles triangular prisms having prism angles $\varphi_1$. The micro-prism structure in region 671 includes a plurality of isosceles triangular prisms having prism angles $\varphi_2$. The micro-prism structure in region 672 includes a plurality of isosceles triangular prisms having prism angle $\varphi_1$. Each of the regions 670, 671, and 672 shapes light (represented by the arrows 679, 680, and 681) to focus or narrow the range of viewing angles $\Delta\theta_1$, $\Delta\theta_2$, $\Delta\theta_1$ of a beam of light passing through the film 660. The compressed beam increases brightness along a narrower range of viewing angles. The range of viewing angles $\Delta\theta$ depends on the prism angle $\varphi$ of the triangular prisms of the corresponding microstructure 655. For example, regions 670 and 672 shape the light with a viewing angle of 35° of a beam of light passing through the region, and the region 671 shapes the light with a viewing angle of 45° of a beam of light passing through the region.

Figure 7:
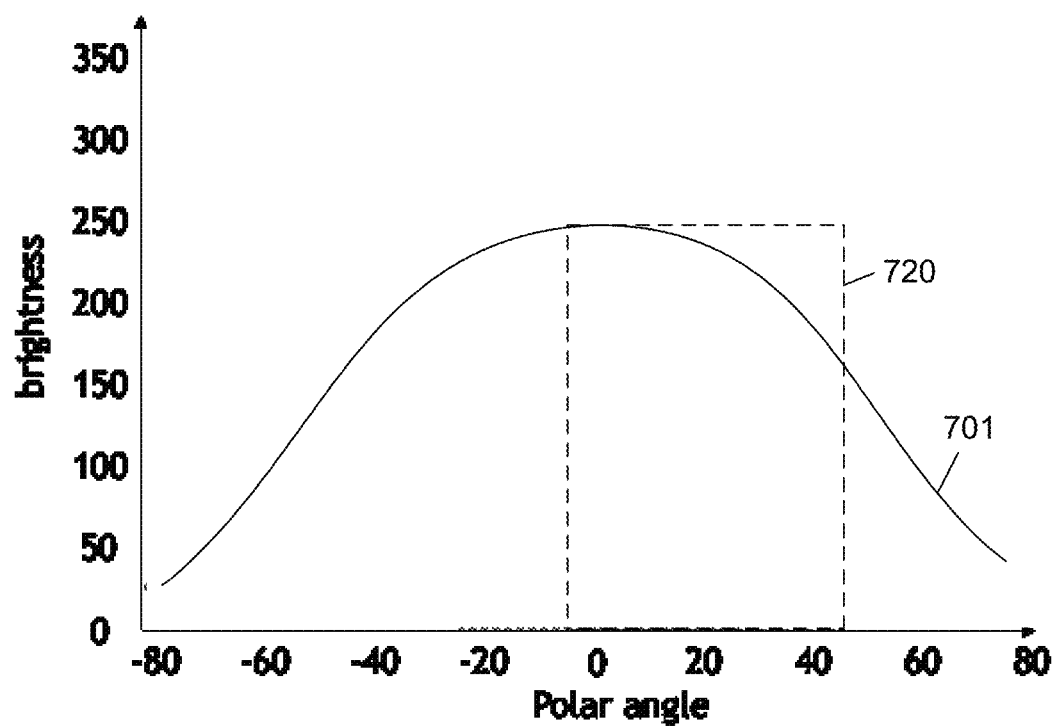
FIGS. 7 and 8 show exemplary graphs of brightness in relation to a polar angle for display systems contrasting the display devices of FIG. 1B and FIG. 4A.
Figure 8:
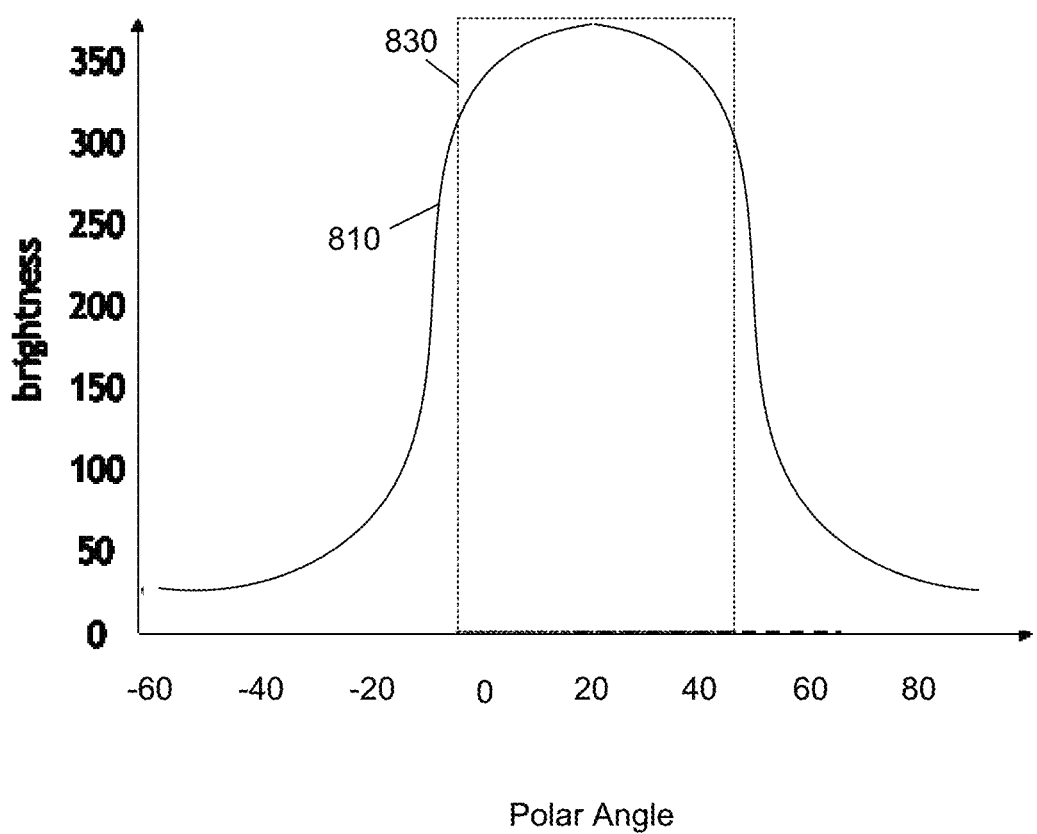

FIGS. 7 and 8 show exemplary graphs of brightness in relation to a polar angle for display systems contrasting the display devices of FIG. 1A and FIG. 4.

FIG. 7 shows a brightness curve 701 of a display according to FIG. 1A. FIG. 8 shows a brightness curve 810 of a display device according to FIG. 4 having a light directing layer as described herein. In the examples shown in FIGS. 7 and 8, a display system having a viewing box with viewing angles of −5, 45. The brightness and intensity distribution of a display according to FIG. 1A in shown as viewing box 720 in FIG. 7. The brightness and intensity distribution of a display device with a light directing layer is shown as viewing box 830 in FIG. 8. As can be seen from FIGS. 7 and 8, by focusing the beam and turning the angle of the of rays emitted from the display device, the width of the intensity distribution is narrowed and the brightness is increased within the viewing box 830 of the display device with a light directing layer as compared to the viewing box 220 of the display device of FIG. 1A.

Figure 9A:
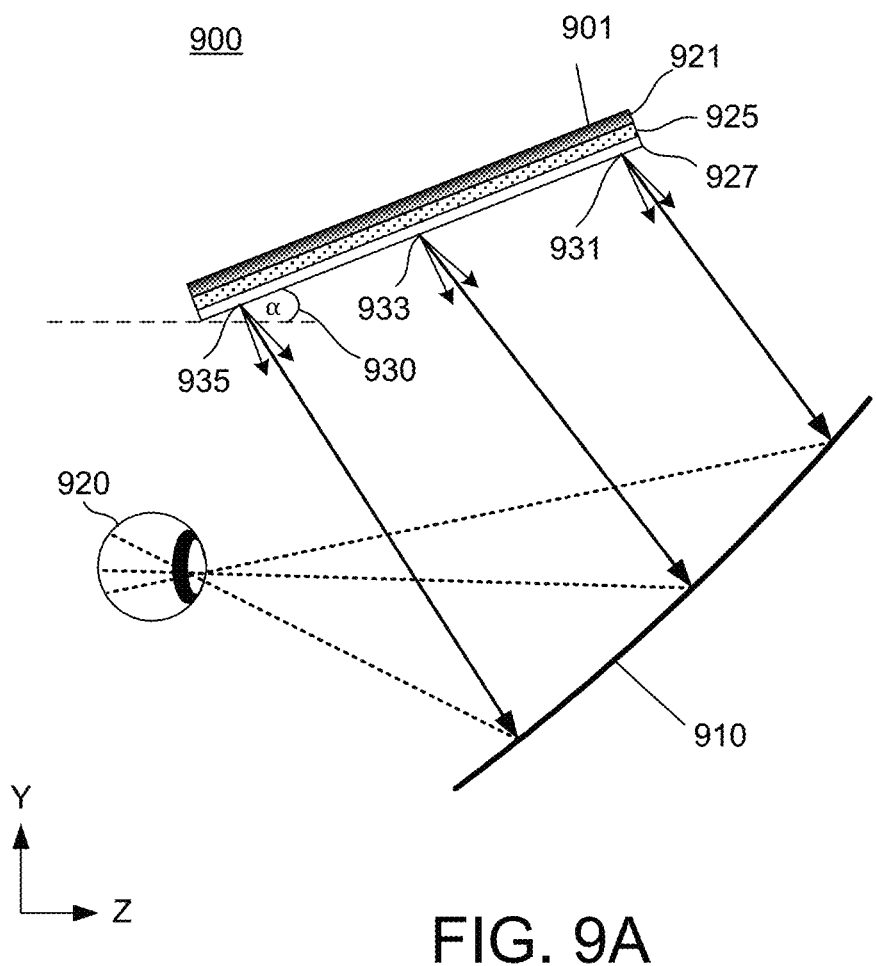

FIG. 9 shows a side, cut away view in the y-z plane of an example 900 of the arrangement of the visual components in an off-axis display system for a headset of display system 100. As shown in FIG. 9, the visual components of the display system 100 include a display device 901 and an optical component 910 to reflect light from the display device 901, and project the light into the eye 920 of the user. This arrangement is suitable for use in wearable AR and VR display system. The display device 901 includes a backlight 921, light directing layer 925, and display panel 927, according to the description provided above with regard to FIGS. 3-6. However, a self-illuminating display panel also may be used in this arrangement. In this example, the light directing layer 925 includes two DTFs and two BEFs, for example, similar to that shown in FIG. 5C. Although FIG. 9A shows a single display device 901 and optical component 910, it will be appreciated that in a stereoscopic or binocular system at least one the display device 901 and optical component 910 are provided for each eye of the user; however, the descriptions provided herein also apply to monocular display systems.

As shown in FIG. 9A, the display device a two-dimensional (2-D) panel that is disposed within a plane perpendicular to the y-z plane of FIG. 9 and tilted at an angle $\alpha$ 930 with respect to the z-axis of the y-z plane. The display device 901 may generate light rays (e.g., 931, 933, and 935) that correspond to an image displayed by the panel. The light rays form images of virtual content that may be directed at the optical component 910. The light rays associated with image of virtual content are reflected by the optical component 910 into a user's eye 920. The light rays of the image entering the user's eye 920 are perceived as superimposed within the user's view of the real world through optical component 910 to create an augmented reality environment. For example, an image reflected off optical component 910 may create the augmented reality environment such that virtual content (e.g., corresponding to the reflected image) may be perceived to be located in the real world according to a focal distance determined by the curvature of the optical component 910 and the distance travelled by the light rays from the display device 901 to the optical component 910.

It will be appreciated that FIG. 9A depicts a slice of the optical component 910 showing the components curvature in the y-z plane; however, the optical component may also include a curvature in the x-z plane. The shape, curvatures, and/or prescription of the reflective surface of the interior of the optical component 910 may be expressed mathematically to model the surface shape, examples of which include bi-conic, bi-conic Zernike, extended polynomial surface, or more general free form surfaces. For example, the surface shape of the optical component may be described by a free form curve having a base radius r and its surface a local sag. In some implementations, the reflective surface of the aperture of the optical component is freeform, defined by base curvatures in y-z plane and x-z plane in addition to other polynomial terms that add to the local sag (e.g., the sag at the point the ray intersects the reflective surface).

As shown FIG. 9A, the display device 901 (e.g., a 2-D display panel) is tilted at an angle 930 with respect to z axis (and the horizontal or x-z plane) out of view of the user's eyes 920 to avoid obscuring view of the real world through the optical component 910. In one example, display device 901 is tilted with respect to the horizontal or x-z plane at an acute angle $\alpha$ 930 from the z-axis, such as, for example, between 20-25 degrees. In addition, the optical axis of the system 900 is also arranged at an angle with respect to the z-axis (the horizontal or x-z plane). This arrangement of the visual components results in an off-axis system in which the optical axis of the visual components is not coincident with the mechanical center of the components. For example, the optical axis may be along the eye horizontal gaze direction (for example the z-axis), and the mechanical axis of the optical component is perpendicular to the vertex of the optical element's surface.

As shown in FIG. 9A, the eye-box 920 collects the image from the display that is projected onto the optical component 910. Depending on the location of the image on the optical component, the collecting angle of the eye-box is different (e.g., due to the varying curvature and/or prescription of the image reflecting area of the optical component 910). Therefore, the prism angles φ of the microstructures of the DTFs and BEFs are selected to spatially tune and/or optimize the DTFs and BEFs, so that as much of the light emitted from the display device as possible (or desired) is collected by eye-box 920.

For example, the DTFs optimize the angles at which a ray of light (e.g., from light rays 931, 933, and 935) is directed from the display device to match the angle of incidence defined by the optical prescription of the optical element 910 for the point at which the ray is reflected from the optical element 910. For example, the light directing layer shown in FIG. 9 illustrates three different turning angles θ in the y dimension for locations 931, 933, 935 along the display device. In addition, the BEFs are optimized, for example, so that the width the of the intensity distribution of the viewing angle Δθ maximizes the number of photons entering the eye without decreasing the size of the eye-box 920.

In general, a size of the eye-box 920 for a user may be defined for the display system. In this example, the size of the eye-box represents the range within which a user's eye is positioned for viewing with the wearable display device 900. Given the location and spatial profile of the optical element 910 in relation to the display device 901, the optimal path of light from the display device 901 to the optical element 910 is determined. A resulting direction profile of the light from the display device 901 may be mapped for the entire surface of the display 901 and/or for portions or regions of the surface of the display 901. For example, at certain location of the display panel, the direction and viewing angles of the light entering the eye-box 920 are known. The prism angles φ of the microstructures for the DTFs and BEFs at the corresponding location can be selected to increase, maximize, or otherwise select the desired amount of light emitted from this location entering the eye-box 920. By spatially selecting and/or optimizing the prism angles of the DTFs and BEFs, the amount of light from the display device 901 collected by eye-box 920 can be tuned, selected, and/or optimized.

FIG. 9B schematically shows light paths for a display system 950 using an exemplary display device 951. As shown in FIG. 9B, the display system 950 includes a display device 951 arranged relative to an optical element 960 to project the light into the eye of the user 920. This arrangement is suitable for use in a wearable VR display system. The display device 951 includes a backlight 961, a light directing layer 965, and display panel 967, according to the description provided above with regard to FIGS. 3-6. However, a self-illuminating display panel also may be used in this arrangement. In this example, the light directing layer 965 includes two DTFs and two BEFs, for example, similar to that shown in FIG. 5C. Although FIG. 9B shows a single display device 951 and optical component 960, it will be appreciated that in a stereoscopic or binocular system at least one the display device 951 and optical component 960 may be provided for each eye of the user; however, the descriptions provided herein also apply to monocular display systems.

As shown in FIG. 9B, the eye-box 920 collects the image from the display device 951 that is projected through the optical component 960. Depending the optics of the optical component 960, the transmission properties of the optical component 960 are different. Therefore, the prism angles φ of the microstructures of the DTFs and BEFs are selected to spatially tune and/or optimize the DTFs and BEFs, so that as much of the light (or a desired amount) emitted from the display device is collected by eye-box 920.

For example, the DTFs optimize the angle at which a ray of light is directed from the display device 951 to match the optical properties of the optical component 960 for the point at which the ray enters the optical component 960. For example, the light directing layer 965 shown in FIG. 9B illustrates two different turning angles θ in the x dimension for locations 971 and 975 along the display device. In addition, the BEFs are optimized for locations 971, 973, and 975, for example, so that the width the of the intensity distribution of the viewing angle Δθ maximizes the number of photons entering the eye without decreasing the size of the eye-box 920.

As described above, the specific selection of the micro-prism structure of a film (e.g., a DTF and/or BEF) may be matched to the arrangement of the visual components (e.g., the display device and the optical component) of a display system. The arrangement of the visual components may be modelled using a computer aided design (CAD) program in which the location of the visual components of the display system, such as, for example, the display and optical component are precisely known with respect to a CAD origin (e.g., a point (x,y,z) in a volume from which the spatial relation of all other points of the system may be precisely determined). For example, base arrangements of components using the mechanical limitations (i.e., eye to visor nominal distance, panel center to visor center distance) are pre-determined and known to the CAD system. Light emitted by the points of the display also may be modelled or measured using the CAD software. Using a recursive algorithm, the optimal micro-prism angles of the films (e.g., a DTF and/or BEF) of a light directing layer may be determined such that the light emitted by the display device of the system is optimized for the position of an eye box relative to the visual components.

Figure 10:
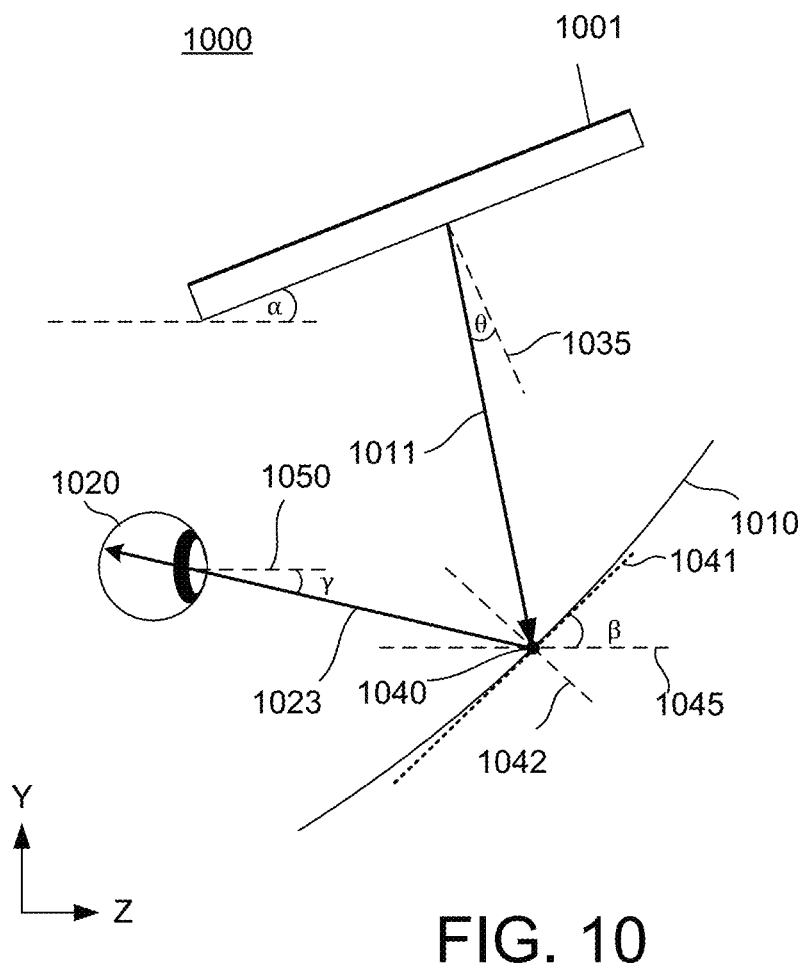
FIG. 10 shows relations of the visual components of a display system used to determine a turning angle of a direction turning film.

FIG. 10 shows one example of the relation of the visual components of the display system used to determine or model a turning angle θ for an off-axis optical system. FIG. 10 shows a side, cut away view in the y-z plane of an example 1000 of the arrangement of the visual components in an off-axis display system for a headset of display system. As shown in FIG. 10A, the visual components of the display system include a display device 1001 and an optical component 1010. One example of a light ray emitted from the display device 1001 is shown. In the example show, the ray 1011 is a main ray emitted by the display 1001 at a point on the display. The ray 1011 is reflected as ray 1023 from the optical component 1010 to the eye 1020 of the user.

As shown in FIG. 10, the display device is a two-dimensional (2-D) panel that is disposed within a plane perpendicular to the y-z plane and tilted at an angle α with respect to the z-axis of the y-z plane. The light ray 1011 is emitted at an angle $\theta_y$ (e.g., corresponding to the turning angle) formed between the ray 1011 and the surface normal 1035 of the display 1001 in the y-z plane. The optical component 1010 has a base curvature in the y-z plane. The shape, curvatures, and/or prescription of the reflective surface of the interior of the optical component 1010 may be expressed mathematically to model the surface shapes examples of which include bi-conic, bi-conic Zernike, extended polynomial surface, or more general free form surfaces. For example, the surface shape of the optical component may be described by a free form curve having a base radius r and its surface a local sag. As shown in FIG. 10, the local curvature at the point of reflection 1040 may be approximated by line 1041 orthogonal to the surface normal 1042 at the point of reflection 1040 to determine the local tilt angle β of the optical component shown between a line 1045 parallel to the z dimension and the line 1041 which intersect at the point of reflection 1040. In addition, a view angle γ is formed by intersection at the pupil of the eye 1020 of the reflected ray 1023 and a line 1050 parallel to the z dimension. Given the display tilt angle α, the local optical component tilt angle β at the point of reflection, and view angle γ, the optimal turning angle θ in the y dimension for the main ray 1011 may be calculated using the following equation:

$$\theta = \pi/2 + \alpha - 2\beta - \gamma$$

A similar modeling of the turning angle in the x dimension may be made. After determining the turning angles for various points of the surface of the display device 1010 in the x and y dimensions, a map of the micro-prism angles for a corresponding regions of DTFs (e.g., a DTF for the y dimension and a DTF for the x dimension) of a light directing layer may be determined and used to fabricate a corresponding DTF.

Other Aspects

FIGS. 11A, 11B, 11C, 11D, and 11E show examples of an implementation of the client system using a head mounted display (HMD), which integrates a display or projector and optics to provide a stereoscopic optical system.

Figure 11A:
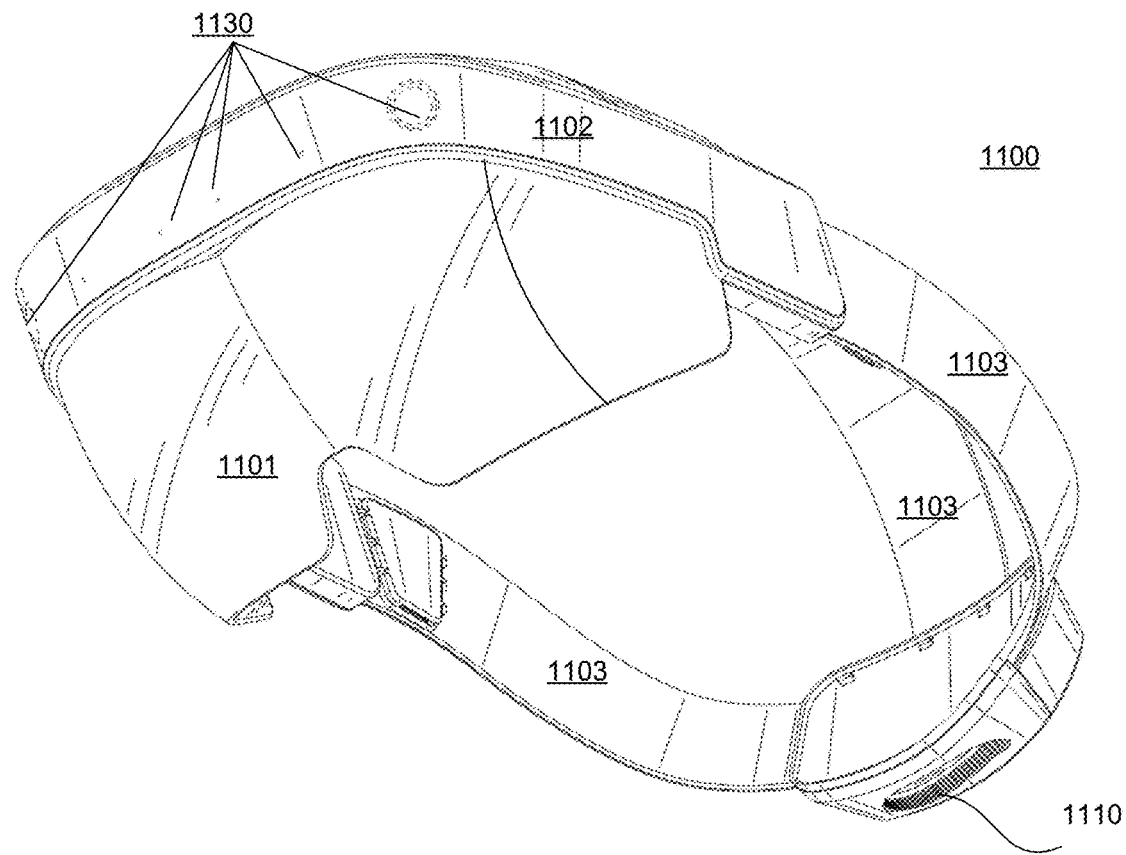
FIGS. 11A, 11B, 11C, 11D, and 11E show examples of a head mounted display system implementation including a display device of FIG. 4.
Figure 11B:
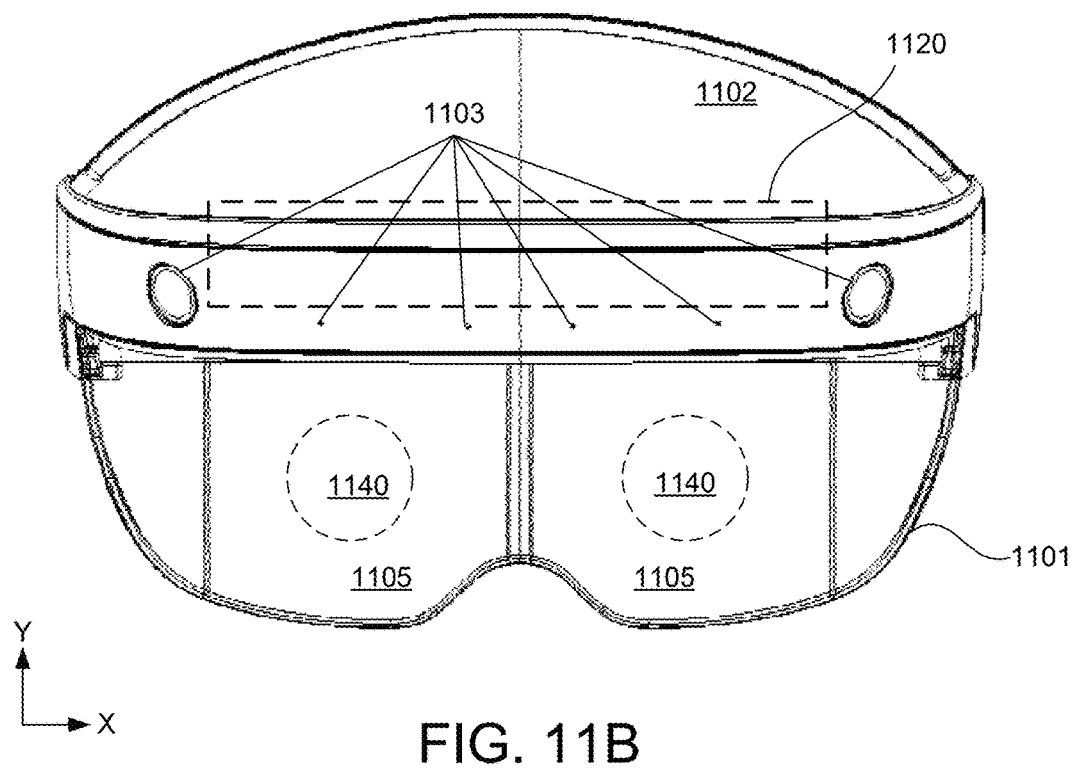
Figure 11C:
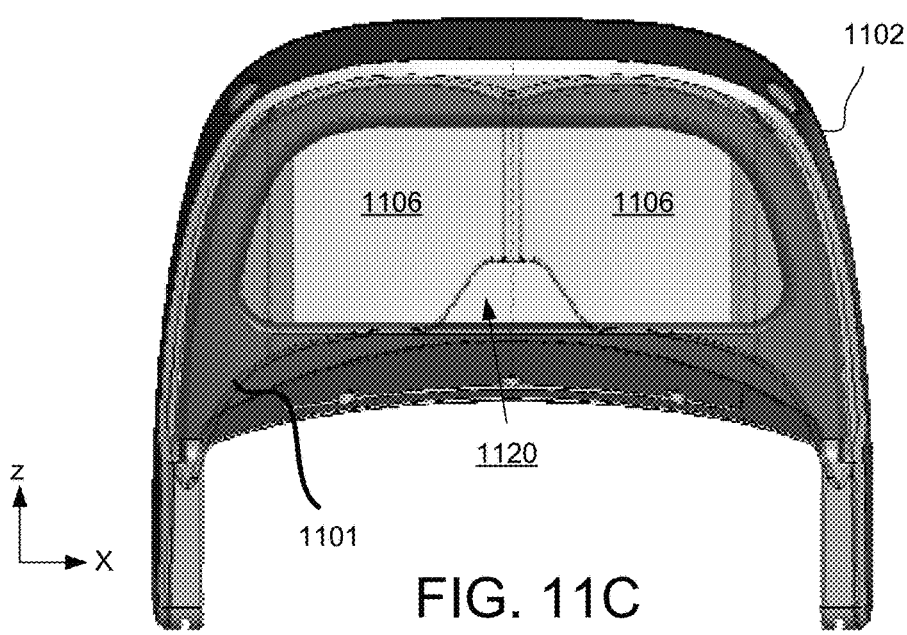

FIGS. 11A, 11B, 11C shows a perspective view, front view, and bottom view, respectively, of one example of an HMD 1100. As shown the HMD includes a visor 1101 attached to a housing 1102, straps 1103, and a mechanical adjuster 1110 used to adjust the position and fit of the HMD to provide comfort and optimal viewing by a user of the HMD 1100. The visor 1101 may include one or more optical elements, such as an image combiner, that includes a shape and one or more reflective coatings that reflect an image from an image source 1120 to the eyes of the user. In one example, the coating is partially reflective allowing light to pass through the visor to the viewer and thus create a synthetic image in the field of view of the user overlaid on the user's environment and provide an augmented reality user interface. The visor 1101 can be made from a variety of materials, including, but not limited to, acrylic, polycarbonate, PMMA, plastic, glass, and/or the like and can be thermoformed, single diamond turned, injection molded, and/or the like to position the optical elements relative to an image source and eyes of the user and facilitate attachment to the housing of the HMD.

In one implementation, the visor 1101 may include two optical elements, for example, image regions 1105, 1106 or clear apertures. In this example, the visor 1101 also includes a nasal or bridge region, and two temporal regions. Each image region is aligned with the position 1140 of one eye of a user (e.g., as shown in FIG. 11B) to reflect an image provided from the image source 1120 to the eye of a user of the HMD. A bridge or nasal region is provided between the two image regions to connect the two regions 1105 and 1106. The image regions 1105 and 1106 mirror each other through the y-z plane that bisects the nasal rejoin. In one implementation, the temporal region extends to an outer edge of the image region wrapping around the eyes to the temple housing of the HMD to provide for peripheral vision and offer support of the optical elements such that the image regions 1105 and 1106 do not require support from a nose of a user wearing the HMD.

Figure 11D:
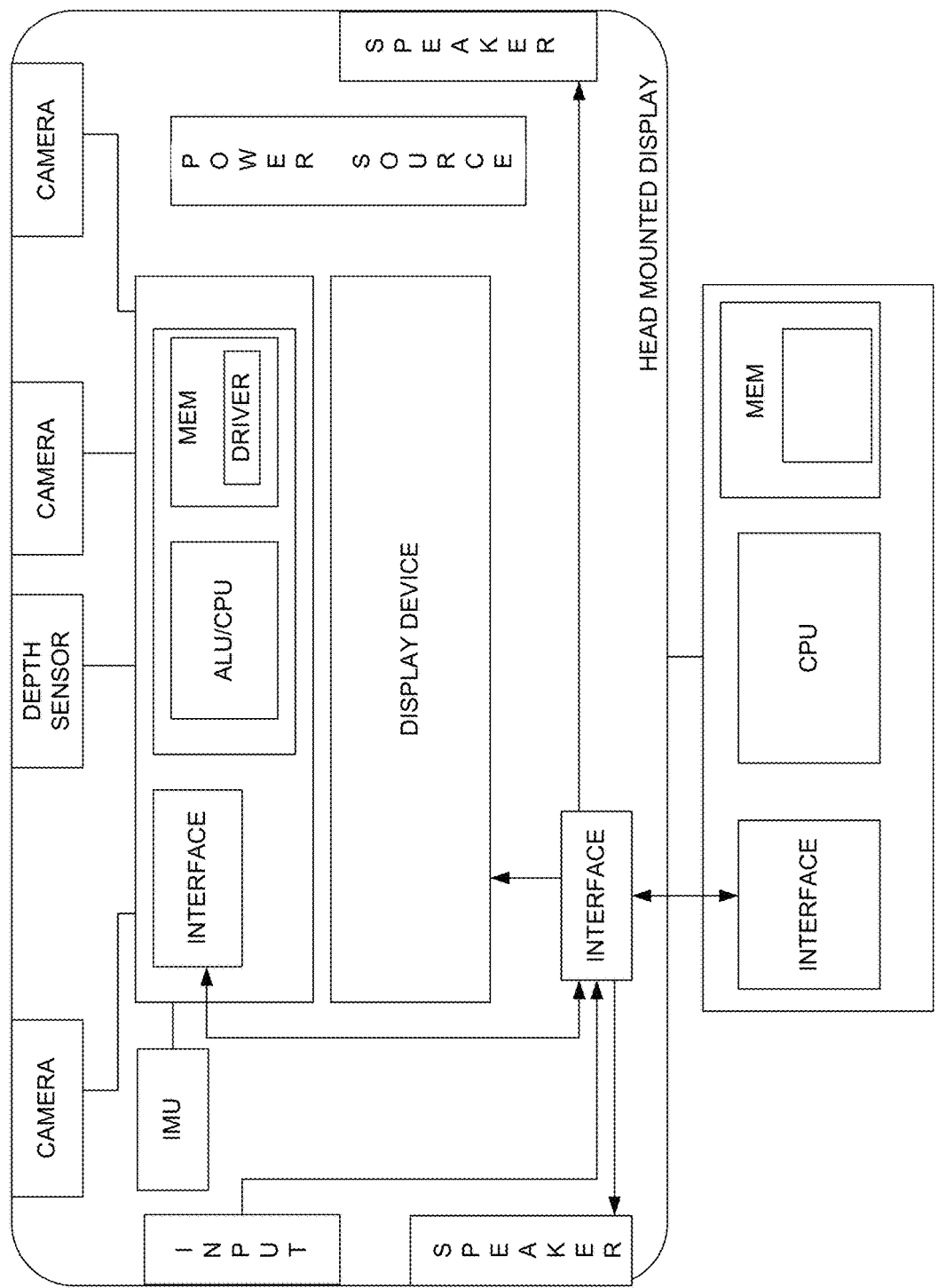
Figure 11E:
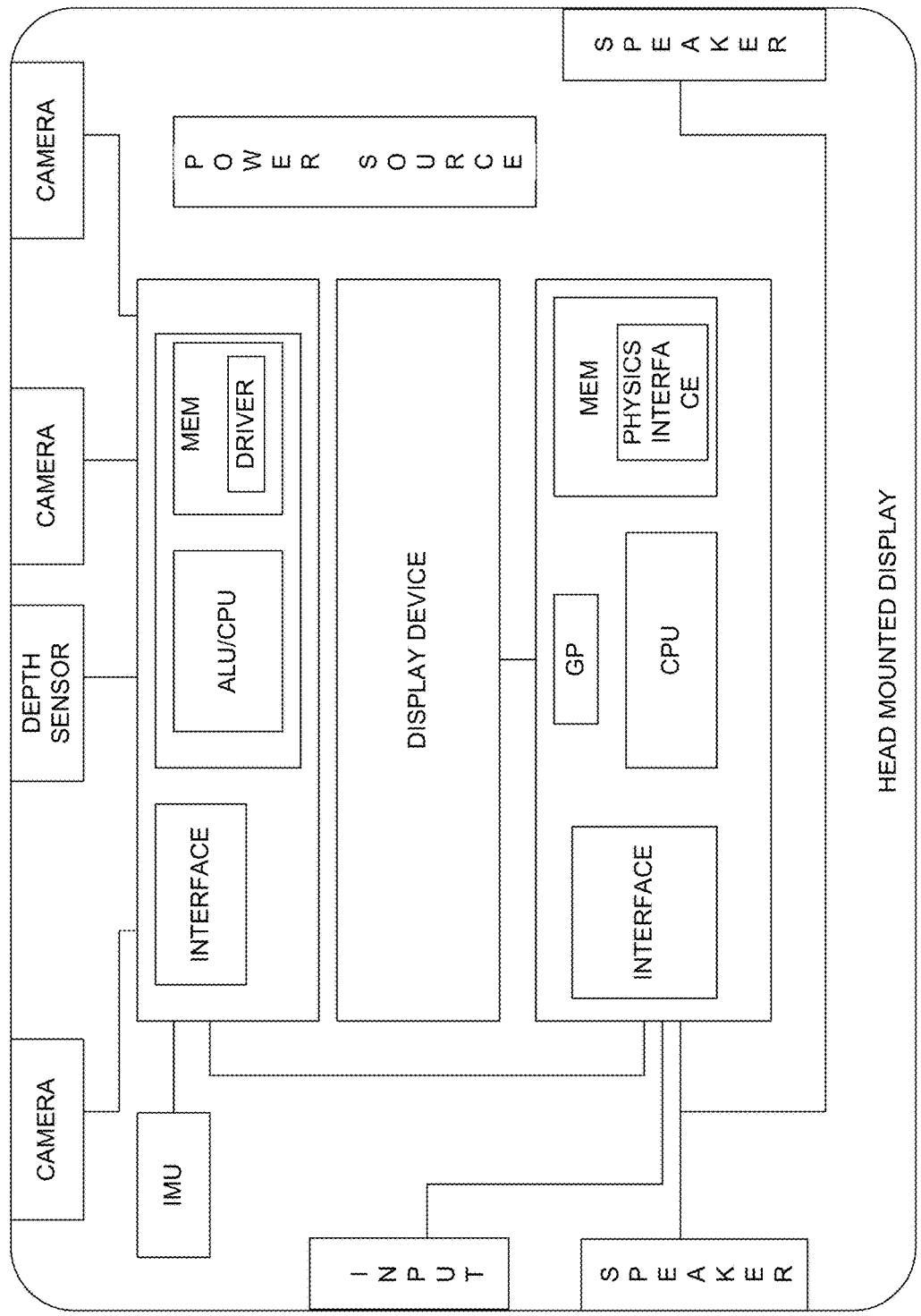

In one implementation, the housing may include a molded section to roughly conform to the forehead of a typical user and/or may be custom-fitted for a specific user or group of users. The housing may include various electrical components of the system, such as sensors 1130, a display device (as described above with regard to FIGS. 3-10), a processor, a power source, interfaces, a memory, and various inputs (e.g., buttons and controls) and outputs (e.g., speakers) and controls in addition to their various related connections and data communication paths. FIG. 11D shows an example of an HMD 1100B in which the processing device 1161 is implemented outside of the housing 1102 and connected to components of the HMD using an interface (e.g. a wireless interface, such as Bluetooth or a wired connection, such as a USB wired connector). FIG. 11E shows an implementation in which the processing device is implemented inside of the housing 1102.

The housing 1102 positions one or more sensors 1130 that detect the environment around the user. In one example, one or more depth sensors are positioned to detect objects in the user's field of vision. The housing also positions the visor 1101 relative to the image source 1120 and the user's eyes. In one example, the image source 1120 may be implemented using one or more of the displays devices described above with regard to FIGS. 3-10. For example, the image source may be a single display device. If an optical element 1105, 1106 of the visor is provided for each eye of a user, the display may be partitioned into at least two halves. For example, each half may display an image intended for a separate eye. In another example, two display devices may be provided. In this example, each display device is paired with a corresponding optical element or image area, where each pair provides an image to an eye of the user. Examples of displays include a liquid crystal display (LCD), a Light Emitting Diode (LED) display, and an OLED display including a light directing layer. In one example, a single 4.5- to 5.2-inch diagonal display device may be used. In another example, dual 2.8-3.4-inch diagonal display device, one for each eye, may be used.

As shown in FIGS. 11D and 11E, a processing device may implement applications or programs for implementing the processes as outlined above. In one example, the processing device includes an associated memory storing one or more applications implemented by the processing device that generate digital image data depicting one or more of graphics, a scene, a graphical user interface, a computer game, a movie, content from the Internet, such as web content accessed from the World Wide Web, among others, that are to be presented to a viewer of the wearable HMD. Examples of applications includes media players, mobile applications, browsers, video games, and graphic user interfaces, to name but a few. In addition, the applications or software may be used in conjunction with other system processes.

As described above, the techniques described herein for a wearable AR and VR system can be implemented using digital electronic circuitry, or in computer hardware, firmware, software, or in combinations of them in conjunction with various combiner imager optics. The techniques can be implemented as a computer program product, i.e., a computer program tangibly embodied in a non-transitory information carrier, for example, in a machine-readable storage device, in machine-readable storage medium, in a computer-readable storage device or, in computer-readable storage medium for execution by, or to control the operation of, data processing apparatus or processing device, for example, a programmable processor, a computer, or multiple computers. A computer program can be written in any form of programming language, including compiled or interpreted languages, and it can be deployed in any form, including as a stand-alone program or as a module, component, subroutine, or other unit suitable for use in the specific computing environment. A computer program can be deployed to be executed by one component or multiple components of the vision system.

The exemplary processes and others can be performed by one or more programmable processing devices or processors executing one or more computer programs to perform the functions of the techniques described above by operating on input digital data and generating a corresponding output. Method steps and techniques also can be implemented as, special purpose logic circuitry, e.g., an FPGA (field programmable gate array) or an ASIC (application-specific integrated circuit).

Processing devices or processors suitable for the execution of a computer program include, by way of example, both general and special purpose microprocessors, and any one or more processors of any kind of digital computer. Generally, a processor will receive instructions and data from a read-only memory or a random-access memory or both. The essential elements of a computer are a processor for executing instructions and one or more memory devices for storing instructions and data. The processing devices described herein may include one or more processors and/or cores. Generally, a processing device will also include, or be operatively coupled to receive data from or transfer data to, or both, one or more mass storage devices for storing data, such as, magnetic, magneto-optical disks, or optical disks. Non-transitory information carriers suitable for embodying computer program instructions and data include all forms of non-volatile memory, including by way of example semiconductor memory devices, such as, EPROM, EEPROM, and flash memory or solid state memory devices; magnetic disks, such as, internal hard disks or removable disks; magneto-optical disks; and CD-ROM and DVD-ROM disks. The processor and the memory can be supplemented by, or incorporated in special purpose logic circuitry.

The HMD may include various other components including various optical devices and frames or other structure for positioning or mounting the display or projection system on a user allowing a user to wear the vision system while providing a comfortable viewing experience for a user. The HMD may include one or more additional components, such as, for example, one or more power devices or connections to power devices to power various system components, one or more controllers/drivers for operating system components, one or more output devices (such as a speaker), one or more sensors for providing the system with information used to provide an augmented reality to the user of the system, one or more interfaces from communication with external output devices, one or more interfaces for communication with an external memory devices or processors, and one or more communications interfaces configured to send and receive data over various communications paths. In addition, one or more internal communication links or busses may be provided in order to connect the various components and allow reception, transmission, manipulation and storage of data and programs.

The aspects (examples, alterations, modifications, options, variations, embodiments, and any equivalent thereof) are described with reference to the drawings; it should be understood that the descriptions herein show by way of illustration various embodiments in which claimed inventions may be practiced and are not exhaustive or exclusive. They are presented only to assist in understanding and teach the claimed principles. It should be understood that they are not necessarily representative of all claimed inventions. As such, certain aspects of the disclosure have not been discussed herein. That alternate embodiments may not have been presented for a specific portion of the invention or that further alternate embodiments that are not described may be available for a portion is not to be considered a disclaimer of those alternate embodiments. It will be appreciated that many of those embodiments not described incorporate the same principles of the invention and others that are equivalent. Thus, it is to be understood that other embodiments may be utilized and functional, logical, organizational, structural and/or topological modifications may be made without departing from the scope and/or spirit of the disclosure.

In order to address various issues and advance the art, the entirety of this application (including the Cover Page, Title, Headings, Detailed Description, Claims, Abstract, Figures, Appendices and/or otherwise) shows by way of illustration various embodiments in which the claimed inventions may be practiced. The advantages and features of the application are of a representative sample of embodiments only, and are not exhaustive and/or exclusive. They are presented only to assist in understanding and teach the claimed principles. It should be understood that they are not representative of all claimed inventions. In addition, the disclosure includes other inventions not presently claimed. Applicant reserves all rights in those presently unclaimed inventions including the right to claim such inventions, file additional applications, continuations, continuations in part, divisions, and/or the like thereof. As such, it should be understood that advantages, embodiments, examples, functional, features, logical, organizational, structural, topological, and/or other aspects of the disclosure are not to be considered limitations on the disclosure as defined by the claims or limitations on equivalents to the claims.

What is claimed is:

1. A wearable display system comprising:
    a display device including:
        a display panel;
        an illumination source;
        a light directing layer arranged between the display panel and the illumination source configured to direct light emitted by illumination source, the light directing layer including one or more transparent films directing light from the illumination source passing through the one or more films and illuminating an image presented by the display panel; and
    an optical component including a reflective or partially reflective surface, the reflective or partially reflective surface of the optical component configured relative to the display device to project the image from the display panel to an eye of a user wearing the display system,
    wherein at least one transparent film of the light directing layer includes a microstructure, formed in the at least one transparent film, directing or shaping light from the illumination source passing through the at least one transparent film.

2. The system of claim 1, wherein the at least one transparent film is a brightness enhancing film and the microstructure narrows a range of viewing angles of a beam of light passing through the brightness enhancing film increasing an amount of light emitted from the display panel along an angle of incidence formed from the display panel to the optical component to the eye of a user wearing the display system.

3. The system of claim 1, wherein the microstructure formed in the at least one transparent film includes two or more parallel, triangular grooves or notches formed in a surface of the one transparent film, the grooves or notches forming one or more right angled prisms, each right angled prism having a prism angle corresponding to the direction of light emitted from the display panel.

4. The system of claim 3, wherein the microstructure formed in the at least one transparent film includes at least two right angled prisms each having different prism angles.

5. The system of claim 3, wherein the prism angle corresponds to an angle of incidence defined by an optical prescription of the optical component at a point of the surface at which a main ray of light emitted from the display is reflected from the optical component to the eye.

6. The system of claim 3, wherein the light directing layer comprises one or more second transparent films, each second transparent film including two or more parallel, triangular grooves or notches formed in a surface of the second transparent film, the grooves or notches forming one or more isosceles triangle prisms, each isosceles triangle prism having a prism angle that narrows a width of an intensity distribution of light emitted from a point of the display panel.

7. The system of claim 3, wherein the light directing layer includes a second transparent film including a microstructure, formed in the second transparent film, including two or more parallel, triangular grooves or notches formed in a surface of the second transparent film, and the grooves or notches of the second transparent film form one or more right triangle prisms where each right triangle prism of the second transparent film has a prism angle corresponding to the direction of light emitted from the display panel, and wherein the triangular grooves or notches of the microstructure of the at least one transparent film are parallel to a first dimension and the triangular grooves or notches the microstructure of the second transparent film are parallel to a second dimension orthogonal to the first dimension.

8. The system of claim 1, wherein the microstructure of the at least one transparent film narrows a range of viewing angles of a beam of light passing through the at least one transparent film prism.

9. The system of claim 1, wherein the microstructure of the at least one transparent film of the light directing layer has a first region and a second region, the first region having a micro-prism structure that turns light emitted from the display panel with respect to a surface normal of the display panel at a first turning angle and the second region having a micro-prism structure that turns light emitted from the display panel with respect to the surface normal of the display panel at second turning angle that is different from the first angle.

10. The system of claim 9, wherein the turning angle of each region formed in the film corresponds to an optical property of the optical component at a portion of the optical component where main rays of light passing through each region are reflected or partially reflected by the optical component to the eye of a user wearing the display system.

11. The system of claim 1, wherein the light directing layer includes a second transparent film including a microstructure, formed in the second transparent film, turning or shaping light from the illumination source passing through the second transparent film, where the microstructure of the at least one transparent film turns or shapes light passing through the at least one transparent film in a first spatial dimension of the display system and the microstructure of the second transparent film turns or shapes light passing through the second transparent film in a second spatial dimension of the display system orthogonal to the first spatial dimension.

12. The system of claim 1, wherein the microstructure formed in the at least one transparent film includes two or more parallel, triangular grooves or notches formed in a surface of the one transparent film, the grooves or notches forming one or more isosceles triangle prisms, each isosceles triangle prism having a prism angle prism angle that narrows a width of an intensity distribution of light emitted from a point of the display panel.

13. The system of claim 1, wherein the at least one transparent film is a direction turning film and the microstructure directs a main ray of a beam of light passing through the direction turning film and emitted from the display device at an angle corresponds to an optical property of the optical component at a point on the optical component where the main ray is reflected or partially reflected by the optical component.

14. The system of claim 1, wherein the microstructure formed in the at least one transparent film includes two or more parallel, triangular grooves or notches formed in a surface of the one transparent film, the grooves or notches forming one or more isosceles triangle prisms, each isosceles triangle prism having a prism angle shaping light emitted from the display panel.

15. The system of claim 14, wherein the microstructure formed in the at least one transparent film includes at least two isosceles triangle prisms each having different prism angles.

16. The system of claim 14, wherein the prism angle corresponds to an angle of incidence defined by an optical prescription of the optical component at a point of the surface of the optical component at which a ray of light emitted from the display is reflected from the optical component to the eye of a user wearing the display system.

17. The system of claim 14, wherein the light directing layer includes a second transparent film including a microstructure, formed in the second transparent film, including two or more parallel, triangular grooves or notches formed in a surface of the second transparent film, and the grooves or notches of the second transparent film form one or more isosceles triangle prisms where each isosceles triangle prism of the second transparent film has a prism angle shaping light emitted from the display panel, and wherein the triangular grooves or notches of the microstructure of the at least one transparent film are parallel to a first dimension and the triangular grooves or notches the microstructure of the second transparent film are parallel to a second dimension orthogonal to the first dimension.

18. The system of claim 1, wherein the microstructure of the at least one transparent film of the light directing layer has a first region having a micro-prism structure that narrows an intensity distribution of light passing through the first region to a first width and a second region having a micro-prism that narrows an intensity distribution of light passing through the second region to a second width that is different from the first width.

19. The system of claim 18, wherein the narrowing width of each region formed in the at least one transparent film corresponds to an optical property of the optical component at a portion of the optical component where rays of light passing through each region are reflected or partially reflected by the optical component to the eye of a user wearing the display system.

20. The system of claim 1, wherein the light directing layer includes a plurality of transparent films each transparent film layered on another transparent film, and each transparent film including a microstructure directing or shaping light from the illumination source passing through each corresponding transparent film.

21. The system of claim 1, wherein a portion of the at least one transparent film is without a microstructure and the direction or shaping of light passing through the portion is unaffected by the at least one transparent film.

22. A wearable display system comprising:
a display device including:
a display panel;
one or more transparent films arranged on a surface of the display panel of the display device configured to direct light passing through the one or more films; and
an optical component including a reflective or partially reflective surface, the reflective or partially reflective surface of the optical component configured relative to the display device to project light corresponding to an image presented by the display device to an eye of a user wearing the display system, wherein at least one transparent film of the light directing layer includes a microstructure, formed in the at least one transparent film, turning or shaping light from passing through the at least one transparent film.

23. The system of claim 22, wherein the microstructure of the at least one transparent film narrows a range of viewing angles of a beam of light passing through the at least one transparent film.

24. The system of claim 22, wherein the microstructure formed in the at least one transparent film includes two or more parallel, triangular grooves or notches formed in a surface of the at least one transparent film, the grooves or notches forming one or more right angled prisms, each right angled prism having a prism angle corresponding to a direction of light emitted from the display panel.

25. The system of claim 24, wherein the light directing layer includes a second transparent film including a microstructure, formed in the second transparent film, including two or more parallel, triangular grooves or notches formed in a surface of the second transparent film, and the grooves or notches of the second transparent film form one or more right triangle prisms where each right triangle prism of the second transparent film has a prism angle corresponding to the direction of light emitted from the display panel, and wherein the triangular grooves or notches of the microstructure of the at least one transparent film are parallel to a first dimension and the triangular grooves or notches the microstructure of the second transparent film are parallel to a second dimension orthogonal to the first dimension.

26. The system of claim 22, wherein the microstructure formed in the at least one transparent film includes two or more parallel, triangular grooves or notches formed in a surface of the one transparent film, the grooves or notches forming one or more isosceles triangle prisms, each isosceles triangle prism having a prism angle prism angle that narrows a width of an intensity distribution of light emitted from a point of the display panel.

27. The system of claim 22, wherein the microstructure formed in the at least one transparent film includes two or more parallel, triangular grooves or notches formed in a surface of the one transparent film, the grooves or notches forming one or more isosceles triangle prisms, each isosceles triangle prism having a prism angle shaping light emitted from the display panel.

28. The system of claim 27, wherein the light directing layer includes a second transparent film including a microstructure, formed in the second transparent film, including two or more parallel, triangular grooves or notches formed in a surface of the second transparent film, and the grooves or notches of the second transparent film form one or more isosceles triangle prisms where each isosceles triangle prism of the second transparent film has a prism angle shaping light emitted from the display panel, and wherein the triangular grooves or notches of the microstructure of the at least one transparent film are parallel to a first dimension and the triangular grooves or notches the microstructure of the second transparent film are parallel to a second dimension orthogonal to the first dimension.

29. The system of claim 22 wherein the display device further comprises an illumination source arranged to illuminate the display panel, and wherein light from the illumination source is directed by the one or more transparent films as the light from the illumination source passes through the one or more transparent films.

30. The system of claim 22, wherein a portion of the at least one transparent film is without a microstructure and the direction or shaping of light passing through the portion is unaffected by the at least one transparent film.

31. A wearable display system comprising:
a display device including:
a display panel;
a backlight configured to illuminate an image presented by the display panel; and
an optical component including a reflective or partially reflective surface, the reflective or partially reflective surface of the optical component configured relative to the display device to project the image from the display panel to an eye of a user wearing the display system, wherein the backlight includes an illumination source and one or more transparent films arranged between the illumination source and the display panel, where at least one transparent film includes a microstructure configured to turn or shape light from the illumination source passing through the at least one transparent film.

* * * * *